US012602906B2

(12) United States Patent
Tsunoda

(10) Patent No.: US 12,602,906 B2
(45) Date of Patent: Apr. 14, 2026

(54) IMAGE RECOGNITION APPARATUS

(71) Applicant: CANON KABUSHIKI KAISHA, Tokyo (JP)

(72) Inventor: Takamasa Tsunoda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 750 days.

(21) Appl. No.: 18/160,186

(22) Filed: Jan. 26, 2023

(65) Prior Publication Data

US 2023/0245427 A1     Aug. 3, 2023

(30) Foreign Application Priority Data

Jan. 31, 2022     (JP) ................................. 2022-013456

(51) Int. Cl.
*G06V 10/77* (2022.01)
*G06V 10/82* (2022.01)
*G06V 20/52* (2022.01)

(52) U.S. Cl.
CPC .......... *G06V 10/7715* (2022.01); *G06V 10/82* (2022.01); *G06V 20/52* (2022.01); *G06V 2201/07* (2022.01)

(58) Field of Classification Search
CPC .... G06V 10/255; G06V 10/454; G06V 10/62; G06V 10/7715; G06V 10/82; G06V 20/52; G06V 20/53; G06V 2201/07; G06V 40/103
See application file for complete search history.

(56) References Cited

U.S. PATENT DOCUMENTS

2021/0012149 A1 *     1/2021   Yamamoto ............. H04N 23/61

FOREIGN PATENT DOCUMENTS

JP          2021016134 A     2/2021

* cited by examiner

*Primary Examiner* — Michael J Vanchy, Jr.
(74) *Attorney, Agent, or Firm* — Canon U.S.A., Inc. IP Division

(57) ABSTRACT

An image recognition apparatus that recognizes a target with respect to image data by detecting a plurality of targets with respect to image data and outputting a plurality of detection objects that is based on the detected plurality of targets, extracting respective feature quantities from the output plurality of detection objects, outputting, with respect to each of the detection objects, a filtered feature, which is a feature quantity obtained by filtering the feature quantity extracted from each of the detection objects, based on a first mask for current time for each detection object predicted at previous time, and predicting the first mask for next time for each of the detection objects.

17 Claims, 12 Drawing Sheets

*200* TRACKING APPARATUS

*220* TRACKING APPARATUS

FIG.5A

|  | *503* | *504* *505* | *501* *502* Det1 | Det2 | Det3 |
|---|---|---|---|---|---|
|  |  |  | p-feat | p-feat | p-feat |
| Track1 | f-feat | mask | 0.1 | 0.6 | 0.8 |
| Track2 | f-feat | mask | 0.6 | 0.2 | 0.5 |
| Track3 | f-feat | mask | 0.8 | 0.7 | 0.1 |
| Track4 | f-feat | mask | 0.5 | 0.4 | 0.8 |

FIG.5B

|  |  |  | *506* *507* | Det1 | Det2 | Det3 |
|---|---|---|---|---|---|---|
|  |  |  |  | g-feat | p-feat | p-feat |
| Track1 | g-feat | f-feat | mask | 0.1 | 0.6 | 0.8 |
| Track2 | g-feat | f-feat | mask | 0.6 | 0.2 | 0.5 |
| Track3 | g-feat | f-feat | mask | 0.8 | 0.7 | 0.1 |
| Track4 | g-feat | f-feat | mask | 0.5 | 0.4 | 0.8 |

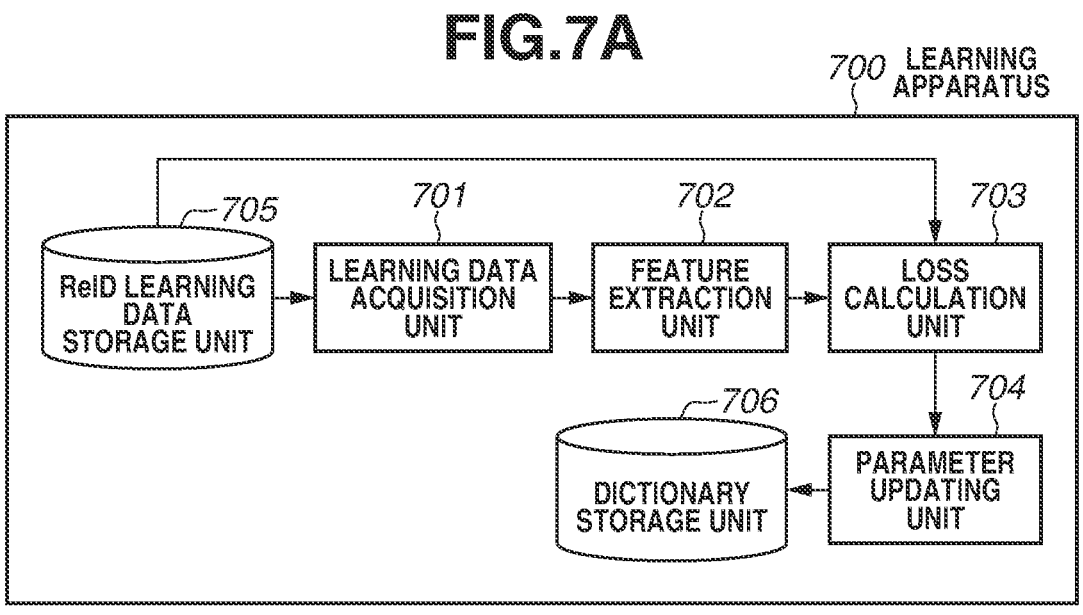

700 LEARNING APPARATUS

705 ReID LEARNING DATA STORAGE UNIT

701 LEARNING DATA ACQUISITION UNIT

702 FEATURE EXTRACTION UNIT

703 LOSS CALCULATION UNIT

706 DICTIONARY STORAGE UNIT

704 PARAMETER UPDATING UNIT

FIG.7B

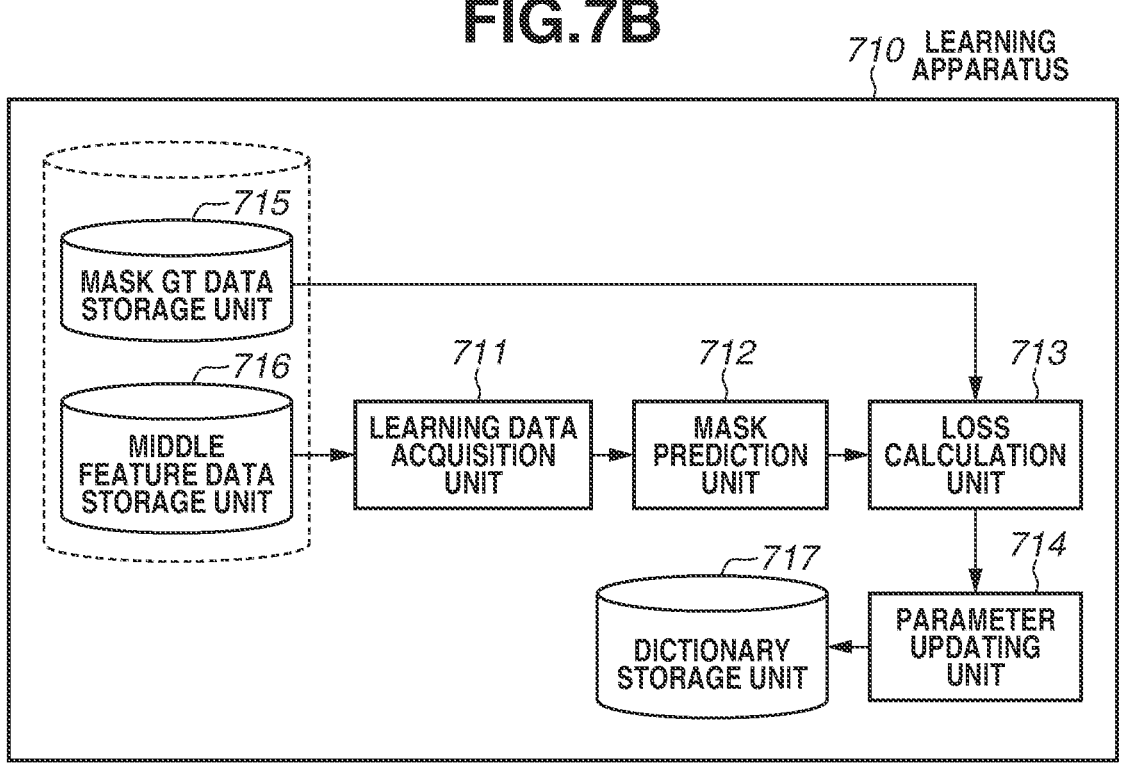

710 LEARNING APPARATUS

715 MASK GT DATA STORAGE UNIT

716 MIDDLE FEATURE DATA STORAGE UNIT

711 LEARNING DATA ACQUISITION UNIT

712 MASK PREDICTION UNIT

713 LOSS CALCULATION UNIT

717 DICTIONARY STORAGE UNIT

714 PARAMETER UPDATING UNIT

*800* LEARNING DATA CREATION APPARATUS

*230* LEARNING UNIT

FIG.9A

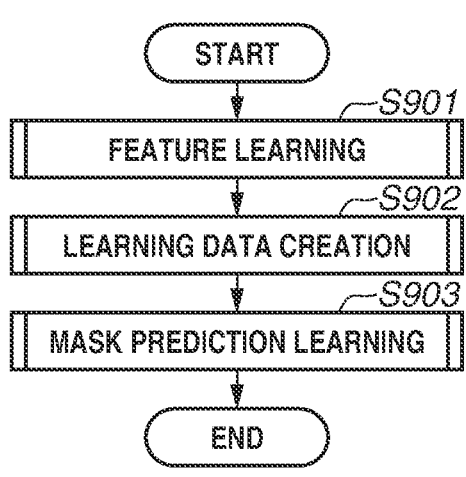

START

FEATURE LEARNING ⟋—S901

LEARNING DATA CREATION ⟋—S902

MASK PREDICTION LEARNING ⟋—S903

END

FIG.9B

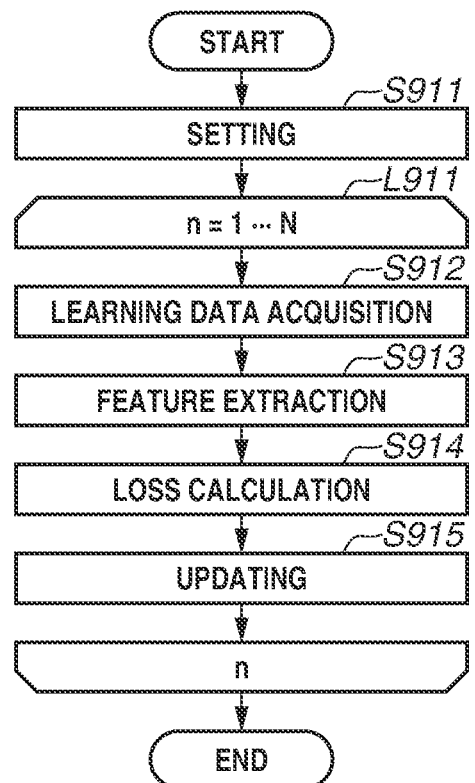

START

SETTING ⟋—S911 n = 1 ··· N ⟋—L911

LEARNING DATA ACQUISITION ⟋—S912

FEATURE EXTRACTION ⟋—S913

LOSS CALCULATION ⟋—S914

UPDATING ⟋—S915 n

END

FIG.9C

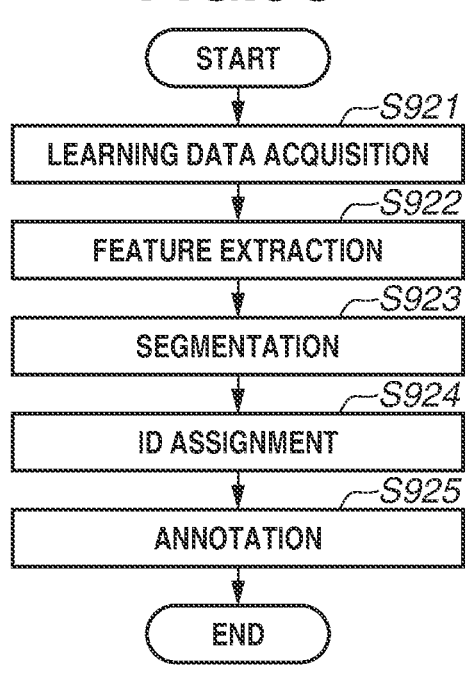

START

LEARNING DATA ACQUISITION ⟋—S921

FEATURE EXTRACTION ⟋—S922

SEGMENTATION ⟋—S923

ID ASSIGNMENT ⟋—S924

ANNOTATION ⟋—S925

END

FIG.9D

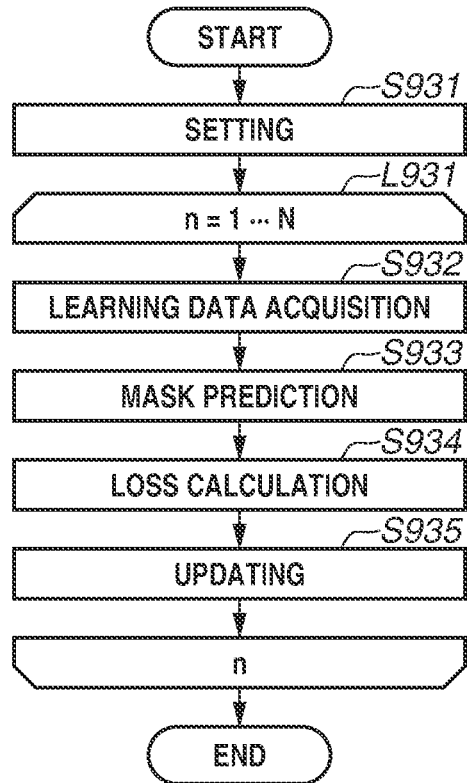

START

SETTING ⟋—S931 n = 1 ··· N ⟋—L931

LEARNING DATA ACQUISITION ⟋—S932

MASK PREDICTION ⟋—S933

LOSS CALCULATION ⟋—S934

UPDATING ⟋—S935 n

END

IMAGE RECOGNITION APPARATUS

BACKGROUND OF THE DISCLOSURE

Field of the Disclosure

Aspects of the present disclosure generally relate to an image recognition apparatus, a learning apparatus, a recognition method for an image recognition apparatus, a learning method for a learning apparatus, and a storage medium.

Description of the Related Art

Heretofore, there has been known a monitoring camera which, in a case where an object image other than a tracking target is included in a search range, extracts an image of the tracking target while masking a feature quantity of the object image, as discussed in Japanese Patent Application Laid-Open No. 2021-16134.

SUMMARY OF THE DISCLOSURE

According to an aspect of the present disclosure, an image recognition apparatus that recognizes a target with respect to image data includes a processor, and a memory storing executable instructions which, when executed by the processor, cause the image recognition apparatus to perform operations including detecting a plurality of targets with respect to image data and outputting a plurality of detection objects that is based on the detected plurality of targets, extracting respective feature quantities from the output plurality of detection objects, outputting, with respect to each of the detection objects, a filtered feature, which is a feature quantity obtained by filtering the feature quantity extracted from each of the detection objects, based on a first mask for current time for each detection object predicted at previous time, and predicting the first mask for next time for each of the detection objects.

Further features of the present disclosure will become apparent from the following description of exemplary embodiments with reference to the attached drawings.

BRIEF DESCRIPTION OF THE DRAWINGS

FIG. 5A and FIG. 5B are diagrams illustrating examples of a cost matrix.

FIG. 7A and FIG. 7B are diagrams illustrating examples of a functional configuration of a learning apparatus.

FIG. 9A, FIG. 9B, FIG. 9C, and FIG. 9D are flowcharts illustrating examples of processing which is performed by the learning apparatus.

FIG. 10A and FIG. 10B are diagrams illustrating examples of a convolutional neural network (CNN).

DESCRIPTION OF THE EMBODIMENTS

Figure 1:
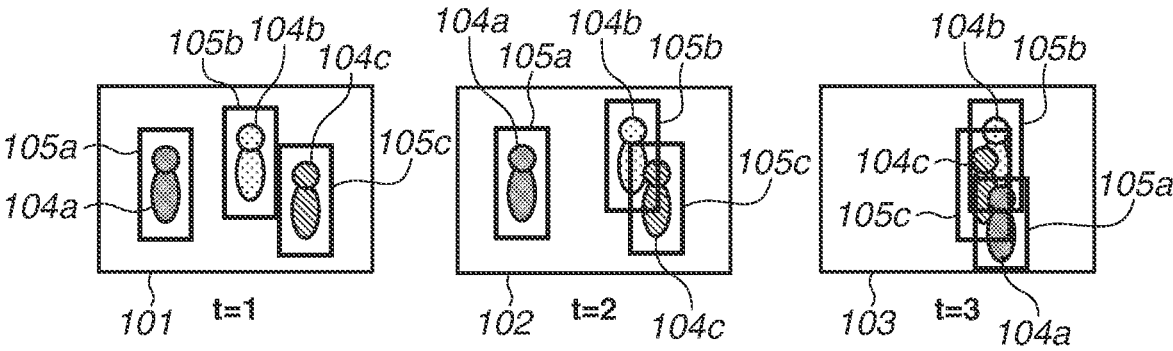
FIG. 1 is a diagram used to explain a moving image and a tracking target.

Various exemplary embodiments, features, and aspects of the present disclosure will be described in detail below with reference to the drawings. Furthermore, configurations described in the following exemplary embodiments are merely examples, and the present disclosure should not be construed to be limited to the illustrated configurations.

In a first exemplary embodiment, a tracking apparatus which performs, with use of a two-stage method (tracking-by-detection paradigm), tracking for a case where a plurality of tracking targets is in proximity to each other is described. The tracking apparatus is capable of tracking a plurality of targets the images of which have been captured as a moving image. Tracking is a composition of two tasks, i.e., detection processing, which is performed in each frame of a moving image, and identity (ID) assignment, which associates a detection result of the current frame with a tracking result for up to the previous frame (hereinafter referred to as a "track"). The ID assignment includes performing association based on the proximities of positions and feature quantities of respective targets.

The two-stage method is a method of performing tracking with use of a detector and a feature extractor which are independent from each other. In the two-stage method, first, the tracking apparatus performs detection with respect to each frame of a moving image with use of the detector, and obtains a circumscribed rectangle (bounding box (hereinafter referred to as a "BBox")) of a tracking target object obtained as a result of detection. Next, the tracking apparatus inputs respective BBoxes to the feature extractor and acquires feature quantities of the respective BBoxes. Next, the tracking apparatus calculates, as an assignment cost, the degree of similarity between a feature quantity of the BBox and a feature quantity of the track. For example, the tracking apparatus performs location prediction and calculates the degree of similarity based on predicted locations and detected positions of the track. Next, the tracking apparatus performs the ID assignment based on the calculated assignment cost. Since the two-stage method is a method of performing tracking based on detection, the paradigm of the two-stage method is also called a tracking-by-detection paradigm.

Principal technical issues for tracking include identity (ID) switch. The ID switch is an error concerning an identifier (ID) which is to be assigned to a tracking target. The ID switch includes an error in which, to a target being tracked, an ID already assigned to another tracking target is assigned by mistake (hereinafter referred to as "ID transfer"). The first exemplary embodiment is directed to reducing the ID transfer.

In the two-stage method, the tracking apparatus crops (trims) an image with a BBox obtained by the detector, inputs the cropped image to the feature extractor, and acquires a feature quantity for person identification. In a case where a plurality of persons is in proximity to each other within an image, a plurality of persons exist in a mixed manner within a BBox, so that feature quantities to be acquired become turbid. Therefore, the tracking apparatus may fail in ID association, so that ID transfer may occur.

In the first exemplary embodiment, to solve the above-mentioned issues, in the two-stage method, the tracking apparatus predicts a mask for a tracking target based on temporal information and performs filtering of feature quantities within a BBox. This enables the tracking apparatus to, even in a case where a plurality of targets is in proximity to each other, prevent turbidity of feature quantities and perform tracking in which the occurrence of ID transfer is reduced.

FIG. 1 is a diagram used to explain a moving image and a tracking target which a tracking apparatus according to the first exemplary embodiment tracks. The moving image is configured with a plurality of frames (images) 101, 102, and 103 which are temporally continuous. The frame 101 is a frame obtained at time t=1. The frame 102 is a frame obtained at time t=2. The frame 103 is a frame obtained at time t=3. The tracking target is assumed to be a person. In each of the frames 101 to 103, three persons 104a, 104b, and 104c exist. The tracking apparatus detects the persons 104a, 104b, and 104c in each of the 101 to 103 and obtains circumscribed rectangles (bounding boxes, hereinafter referred to as "BBoxes") 105a, 105b, and 105c of the persons 104a, 104b, and 104c. The BBox 105a is a circumscribed rectangle of the person 104a. The BBox 105b is a circumscribed rectangle of the person 104b. The BBox 105c is a circumscribed rectangle of the person 104c. Then, the tracking apparatus appends identifiers (IDs) for identifying the persons 104a, 104b, and 104c to the respective BBoxes 105a, 105b, and 105c. In the frames 101 to 103, a gathering of BBoxes to which the same ID has been appended is referred to as a "track". This ID may be hereinafter referred to simply as an "ID" but may also be referred to as a "track ID".

For example, in the frame 103 obtained at time t=3, three persons 104a, 104b, and 104c are in proximity to each other. The persons 104c and 104b are occluded (covered) in part by the persons 104a and 104c situated at the front side. The person 104c is situated at the front side of the person 104b. The area of the person 104c within the BBox 105b is larger than the area of the person 104b within the BBox 105b.

The tracking apparatus calculates the degree of similarity between a feature quantity of a person acquired from the BBox 105c in the frame 103 and a feature quantity of each of the persons 104a, 104b, and 104c in the frame 102.

Then, the feature quantity of a person acquired from the BBox 105c in the frame 103 may become low in the degree of similarity with respect to the feature quantity of the person 104c in the frame 102 and may become high in the degree of similarity with respect to the feature quantity of the person 104b in the frame 102. Similarly, the feature quantity of a person acquired from the BBox 105b in the frame 103 may become low in the degree of similarity with respect to the feature quantity of the person 104b in the frame 102 and may become high in the degree of similarity with respect to the feature quantity of the person 104c in the frame 102.

The tracking apparatus performs ID assignment, which associates a person acquired from each BBox of the current frame 103 with a track for up to the previous frame, based on the proximity of feature quantities. Then, the tracking apparatus assigns the ID of the person 104b to a person acquired from the BBox 105c in the frame 103 and assigns the ID of the person 104c to a person acquired from the BBox 105b in the frame 103, so that erroneous assignment may occur. This erroneous assignment of an ID is ID transfer.

While this is merely an example, the tracking apparatus according to the first exemplary embodiment is able to prevent ID transfer, which occurs due to the turbidity of feature quantities caused by such an occlusion.

Figure 2A:
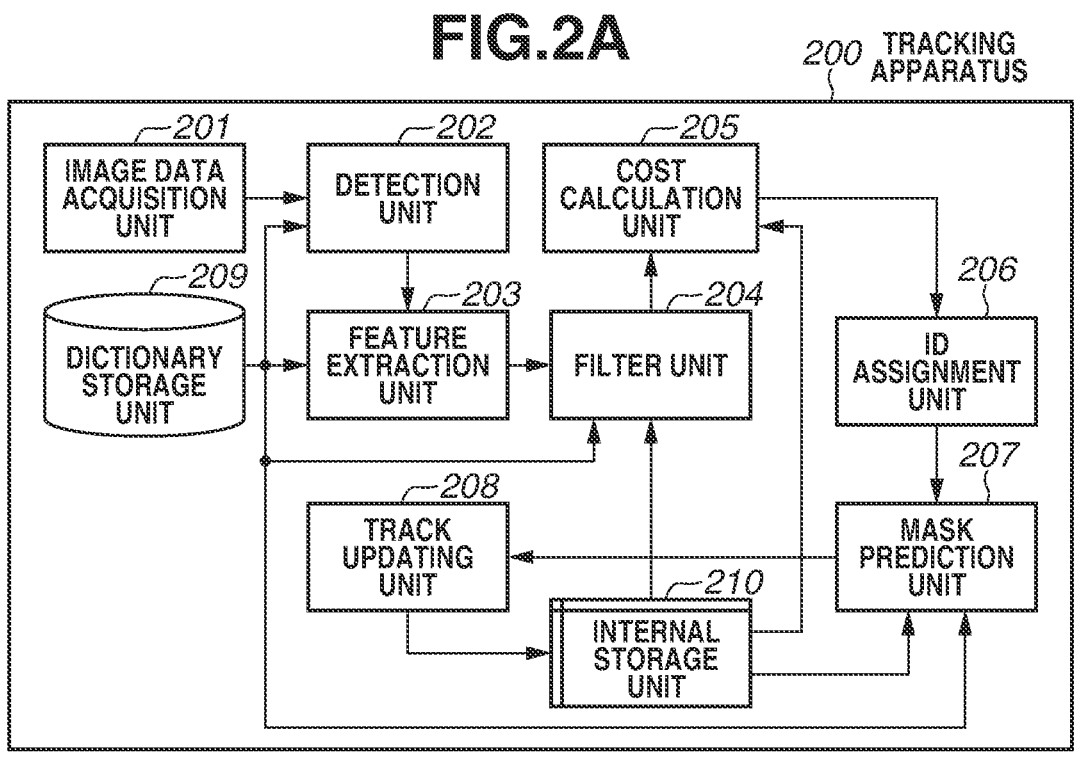
FIG. 2A and FIG. 2B are diagrams illustrating examples of a functional configuration of a tracking apparatus.

FIG. 2A is a diagram illustrating a functional configuration example in processing during run-time of a tracking apparatus 200 according to the first exemplary embodiment. The tracking apparatus 200 is an example of an image recognition apparatus. The tracking apparatus 200 includes an image data acquisition unit 201, a detection unit 202, a feature extraction unit 203, a filter unit 204, a cost calculation unit 205, an ID assignment unit 206, a mask prediction unit 207, a track updating unit 208, a dictionary storage unit 209, an internal storage unit 210. The details of these functional constituent units are described with reference to, for example, FIG. 3A.

Figure 3A:
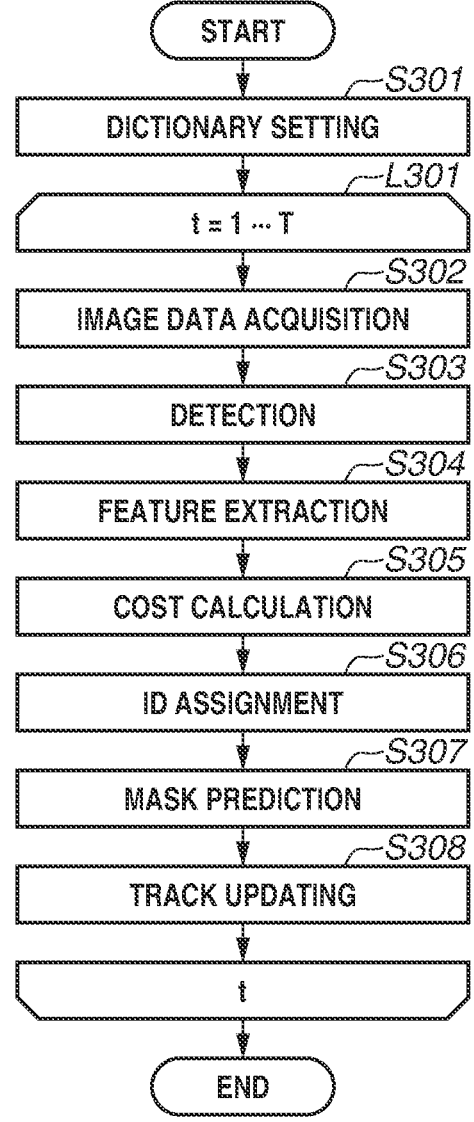
FIG. 3A and FIG. 3B are flowcharts illustrating examples of processing which is performed by the tracking apparatus.

FIG. 3A is a flowchart illustrating processing during run-time which is performed by the tracking apparatus 200 according to the first exemplary embodiment. The processing during run-time which is performed by the tracking apparatus 200 is described with reference to this flowchart.

In step S301, the tracking apparatus 200 sets a dictionary which is currently stored in the dictionary storage unit 209 (FIG. 2A). This dictionary is a dictionary for a CNN or RNN which is used in the detection unit 202 (FIG. 2A), the feature extraction unit 203 (FIG. 2A), the filter unit 204 (FIG. 2A), and the mask prediction unit 207 (FIG. 2A). CNN is an abbreviation for a convolutional neural network. RNN is an abbreviation for a recurrent neural network. The dictionary is an aggregate of parameters obtained by gathering together, for example, weights and biases of respective layers of the network. The dictionary is created by processing which is performed at the time of learning described below. A dictionary which is used during run-time is a trained dictionary which has been trained in processing performed at the time of learning.

Loop L301 is a loop concerning time t=1 to time t=T. The tracking apparatus 200 performs processing on each frame of a moving image. The first loop is loop processing for time t=1. Time t=T is the time of an end frame of the moving image. While, here, a moving image with a previously defined length is assumed, the tracking apparatus 200 is also able to perform processing on a moving image with an undefined length. In that case, the tracking apparatus 200 only needs to end the loop L301 by a different appropriate ending condition.

In step S302, the image data acquisition unit 201 (FIG. 2A) acquires image data about a moving image. This moving image is a moving image file existing on a data storage, streaming data which is delivered via a network, or a moving image which is captured by a camera. With regard to any form of moving image, the image data acquisition unit 201 acquires a frame (image) in the moving image corresponding to time t of the loop L301. For example, in the case of FIG. 1, the image data acquisition unit 201 acquires image data about the frame 101 in the case of time t=1.

In step S303, the detection unit 202 (FIG. 2A) performs detection of a tracking target with respect to the image data acquired in step S302. In a case where the tracking target is a person, the detection unit 202 serves as a human body detection unit, which detect a human body within the image data. The detection unit 202 is a detection unit using a CNN. Parameters (dictionary) for the CNN are currently stored in the dictionary storage unit 209 (FIG. 2A). Moreover, this dictionary is already set to the detection unit 202 in step S301.

The detection unit 202 detects a human body within the image data, and outputs a circumscribed rectangle (BBox) of the detected human body to the feature extraction unit 203. The BBox is an image with a circumscribed rectangle which is used for feature quantity extraction for assignment of a track ID. To extract a feature quantity for identifying a person from a BBox, it is desirable that the position of a human body part, such as a head region or torso, in an image of the BBox be stable. Therefore, even in a case where a foot or a top of head of the human body is occluded, the detection unit 202 outputs a BBox including such a part.

Figure 4:
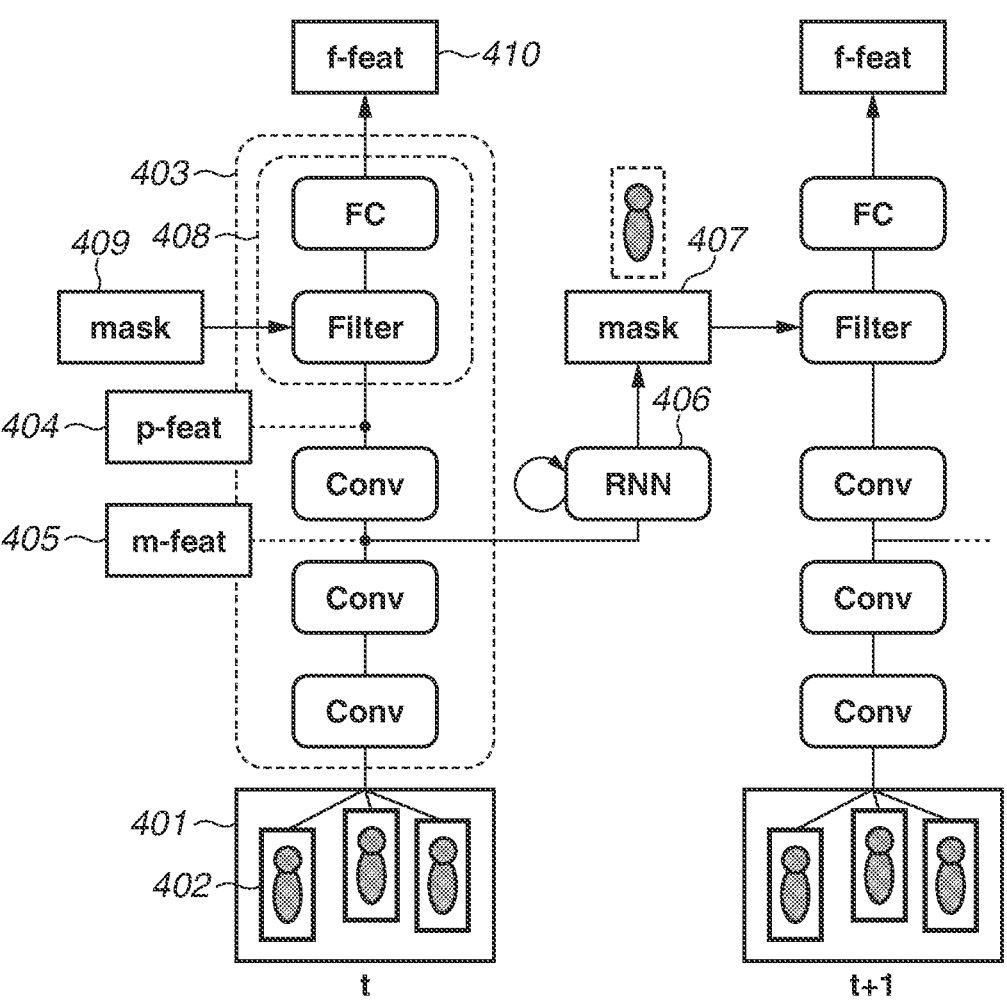
FIG. 4 is a diagram illustrating an example of a configuration of a neural network.

In steps S304, S305, and S306, the tracking apparatus 200 uses a neural network illustrated in FIG. 4. Prior to the description of steps S304, S305, and S306, first, the neural network illustrated in FIG. 4 is described.

A frame 401 illustrated in FIG. 4 represents a fame obtained at time t. In this example, the detection unit 202 detects human bodies of three persons within the frame 401, and outputs a BBox 402 of the detected human body to the feature extraction unit 203. The feature extraction unit 203 crops the image of the frame 401 with the BBox 402 and resizes the cropped image into a specified BBox size. The feature extraction unit 203 outputs the image of the BBox 402 to a CNN 403 for feature quantity extraction. The CNN 403 includes three convolution (Cony) units. Each Cony unit includes a convolutional layer, an activation layer, a pooling layer, and, in some cases, a skip connection. Moreover, a feature quantity is configured to be able to be drawn between Cony units. Here, a pre-filtered feature (p-feat) 404 and a middle feature (m-feat) 405 are able to be drawn out from between Cony units. The middle feature 405 serves as an input to an RNN 406. The RNN 406 has the function of predicting a human body region mask 407 for next time t+1. The details of the RNN 406 are described below. The CNN 403 includes a filter unit 408. The filter unit 408 filters the pre-filtered feature 404 with a human body region mask 409 for next time t predicted at previous time t−1. The details of the filter unit 408 are described below. The CNN 403 eventually outputs a filtered feature (f-feat) 410 for ID assignment.

In step S304 illustrated in FIG. 3A, the feature extraction unit 203 (FIG. 2A) performs extraction of the pre-filtered feature 404 and the middle feature (m-feat) 405 with respect to an image in the BBox 402 detected in previous step S303. In step S304, first, the feature extraction unit 203 performs cropping of the frame 401 of the input image with use of the BBox 402, which is an output in previous step S303, resizes the cropped image into a previously defined size, and thus acquires cropped images with the same size corresponding to the number of detections. Here, for explanatory convenience, the feature extraction unit 203 is assumed to perform resizing into [width, height]=[32, 64] pixels.

Next, the feature extraction unit 203 performs extraction of the pre-filtered feature 404 and the middle feature 405 with respect to the cropped image with use of the CNN 403. Parameters (dictionary) for the CNN 403 are previously learned and stored in the dictionary storage unit 209 (FIG. 2A), and are already set in step S301.

The middle feature 405 and the pre-filtered feature 404 are hierarchical feature quantities having spatial information. For example, the middle feature 405 has a dimension of [[16, 32, 64], [8, 16, 128]]. Here, inner square brackets represent [width, height, channel]. The middle feature 405 includes a feature quantity having two spatial resolutions. Similarly, the pre-filtered feature 404 has a dimension of [[16, 32, 64], [8, 16, 128], [4, 8, 512]].

In step S305, the filter unit 204 (FIG. 2A) calculates an ID assignment cost with use of the cost calculation unit 205 (FIG. 2A). The ID assignment cost is calculated for the number of combinations of human bodies detected in a track for up to the previous time and detected at the current time, and the result of calculation is output as a matrix. While, as mentioned above, the track refers to a gathering of BBoxes with the same ID, here, the track also has information required for cost calculation described below. In the cost calculation, information required for calculation with respect to a track is stored in the internal storage unit 210 (FIG. 2A) and is then read in as needed in step S305.

FIG. 5A illustrates an example of a cost matrix in a case where three detection objects Det1 to Det3 have been detected in four tracks Track1 to Track4 for up to the previous time and at the current time. A matrix 501 is a cost matrix. The rows of the matrix 501 correspond to the tracks Track1 to Track4. The columns of the matrix 501 correspond to the detection objects Det1 to Det3 detected by the detection unit 202. The detection objects Det1 to Det3 are, for example, BBoxes 105a, 105b, and 105c. As the value (cost) of an element of the matrix 501 is smaller, the degree of similarity is higher, and, as the value (cost) of an element of the matrix 501 is larger, the degree of similarity is lower. Each of the tracks Track1 to Track4 has a filtered feature (f-feat) 503 and a human body region mask (mask) 504.

Here, the human body region mask 504 is a human body region mask for the current time predicted at the previous time. A human body region mask for next time which is predicted at the current time is described in step S307. Moreover, each of the detection objects Det1 to Det3 has a pre-filtered feature (p-feat) 502. A cost 505 is an assignment cost calculated from the first track Track1 and the first detection object Det1.

To perform this calculation, first, the filter unit 204 (FIG. 2A) performs filtering of a feature quantity. Here, the filtering is equivalent to calculating the filtered feature 503 of the detection object Det1 with use of the human body region mask 504 of the track Track1 and the pre-filtered feature 502 of the detection object Det1. In the neural network illustrated in FIG. 4, the filtered feature 503 is calculated by the filter unit 408.

Figures 6A, 6B:
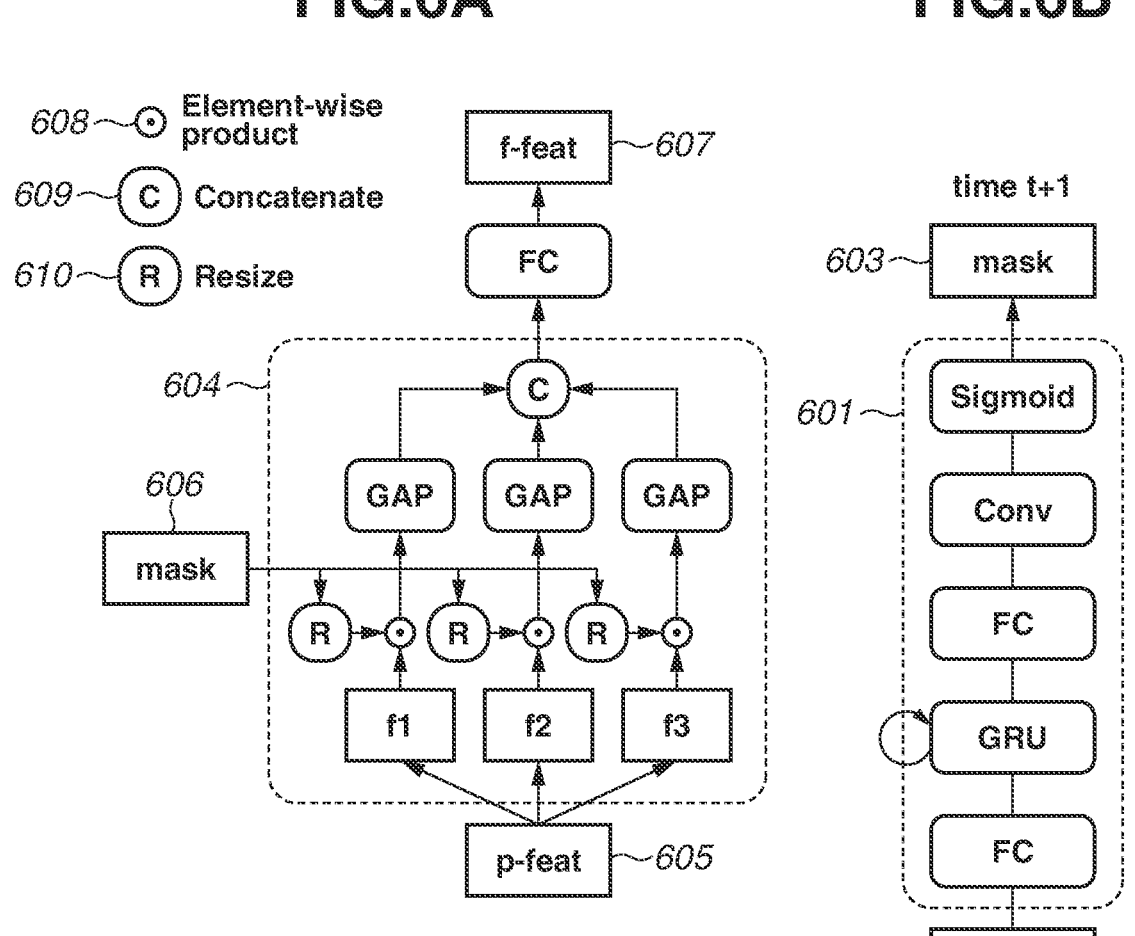
FIG. 6A is a diagram illustrating an example of filter computation.
FIG. 6B is a diagram illustrating an example of a configuration of a recurrent neural network (RNN).

FIG. 6A is a diagram used to detail the filter unit 408. The size of a pre-filtered feature (p-feat) 605 is, as mentioned above, [[16, 32, 64], [8, 16, 128], [4, 8, 512]]. Feature quantities f1, f2, and f3 illustrated in FIG. 6A are respective separated feature quantities of three spatial resolutions of the pre-filtered feature 605. The feature quantity f1 is a feature quantity of the spatial resolution of [16, 32, 64]. The feature quantity f2 is a feature quantity of the spatial resolution of [8, 16, 128]. The feature quantity f3 is a feature quantity of the spatial resolution of [4, 8, 512].

A human body region mask (mask) 606 is a mask for one channel with the same size as the resolution of an input image and has a size of [32, 64, 1]. A multiplication unit (·) 608 performs multiplication with respect to each element. A resize unit (R) 610 performs resizing in a spatial direction, performs copying in a channel direction, and thus makes the mask uniform in the same size as a target for multiplication with respect to each element.

For example, with respect to the feature quantity f1, the resize unit 610 resizes the size of [32, 64, 1] of the human body region mask 606 into [16, 32, 1], performs copying in the channel direction, and thus obtains a size of [16, 32, 64]. Next, the multiplication unit 608 multiplies the human body region mask with the size made uniform by the feature quantity f1 with respect to each element. As a result of this processing, a feature quantity is taken from a human body region obtained at the current time predicted at the previous time, and a feature quantity obtained from a background portion is filtered out. A global average pooling (GAP) unit performs GAP on a tensor subjected to filtering. As a result, the feature quantity f1 becomes a 64-dimensional feature quantity.

A concatenation unit (C) 609 concatenates feature quantities obtained by performing GAP on the respective feature quantities f1 to f3. In an example described in the first exemplary embodiment, the concatenated feature quantities become a 704-dimensional feature quantity. FC denotes a fully connected layer. Here, the FC is a 704-dimensional input and is a 256-dimensional output. Weights and biases of the FC are previously stored in the dictionary storage unit 209 (FIG. 2A) and are currently set in step S301. Finally, the FC outputs a filtered feature (f-feat) 607. The filtered feature 607 has a 256-dimensional feature quantity.

The cost calculation unit 205 (FIG. 2A) calculates the degree of similarity between the filtered feature 607 obtained by the above-mentioned calculation and a filtered feature already included in the track and converts the calculated degree of similarity into a cost. Here, the cost calculation unit 205 calculates a cosine similarity as the degree of similarity. The cosine similarity takes real number values of −1 to +1, where +1 indicates most similar. Usually, an evaluation value which makes positive sense as the value is larger is called a "score", and the opposite evaluation value thereof is called a "cost". To perform conversion into an evaluation value which indicates a high degree of similarity as the value is smaller, i.e., a cost, the cost calculation unit 205 multiplies the cosine similarity by −1. Moreover, depending on an algorithm for an assignment problem which is used in next step S306, it is desirable that the cost be 0 or more. Therefore, here, the cost calculation unit 205 adds 1 as a bias to the cost. Performing the above-described calculation for the number of combinations of the detection objects Det1 to Det3 and the tracks Track1 to Track4 causes the cost matrix 501 to be calculated.

The description here is based on the premise that a track exists for up to the previous frame. There may be a case where no tack exists for up to the previous frame, such as the case of being immediately after starting of tracking. In such a case, since it is impossible to calculate a cost matrix having a finite size, the processing to be performed here is omitted.

In step S306 illustrated in FIG. 3A, the ID assignment unit 206 (FIG. 2A) performs assignment of track IDs with respect to the detection objects Det1 to Det3. The ID assignment unit 206 applies an algorithm for an assignment problem, such as a Hungarian algorithm or a greedy algorithm, to the cost matrix 501 created in previous step S305.

In a case where the number of detection objects Det1 to Det3 is large with respect to the tracks Track1 to Track4 or in a case where the assignment cost for optimum assignment is so large that an assignment result is unreliable, a detection object to which a track ID is not able to be assigned occurs. Moreover, a track ID is also not able to be assigned to a detection object in which no track exists for up to the previous frame. To such a detection object to which a track ID is not able to be assigned, a new ID is assigned. In doing this way, a track ID is assigned to a detection object.

In step S307 illustrated in FIG. 3A, the mask prediction unit 207 (FIG. 2A) performs prediction of a human body region mask for next time. The mask prediction unit 207 performs prediction using the RNN 406. While the RNN 406 is a neural network having a recursive input obtained in the previous state, the one which has a temporal identity is a track. Therefore, here, the previous state of the RNN 406 is included in a track.

Now, as a result of association of a track ID to a detection object performed in previous step S306, the detection object and the track are currently associated with each other. Therefore, the mask prediction unit 207 predicts a human body region mask 407 for next time with use of the middle feature (m-feat) 405 included in the detection object and the previous state of the RNN 406 included in the track.

No track is currently associated with a detection object to which a new ID has been assigned in previous step S306. Therefore, in step S307, the mask prediction unit 207 predicts a human body region mask 407 for next time with use of an initial value as the previous state of the RNN 406. The initial value can be set to zero as with a usual initial value of the RNN 406.

Moreover, a dictionary for the RNN 406 is previously stored in the dictionary storage unit 209 (FIG. 2A) and is currently set in step S301. The previous state of the RNN 406 is retained by the internal storage unit 210 (FIG. 2A), and is read in first in step S307.

FIG. 6B is a diagram illustrating the details of the RNN 406. An RNN 601 illustrated in FIG. 6B corresponds to the RNN 406 illustrated in FIG. 4. The RNN 601 includes, for example, fully connected layers (FCs), a recurrent layer (here, referred to as a gated recurrent unit (GRU)), convolutional layers (Convs), and a sigmoid function (Sigmoid). Each layer is accompanied by, for example, an activation layer. Moreover, between layers, size conversion processing (reshape processing or resize processing) for a tensor intervenes as appropriate. These are omitted from illustration in FIG. 6B. The GRU uses a state obtained at the previous time. The state obtained at the previous time is, as mentioned above, read in from the internal storage unit 210 (FIG. 2A).

A middle feature (m-feat) 602 is an input to the RNN 601, and, as mentioned above, has a size of [[16, 32, 64], [8, 16, 128]]. When being input to the first FC of the RNN 601, the middle feature 602 is made flat. Thus, the middle feature 602 has an input size of [49152]. The second FC, the Conv, the reshape layer, and the resize layer of the RNN 601 perform conversion into an appropriate size. The Sigmoid receives, as an input, a tensor for one channel with the same size as that of an input image. Thus, the size is [32, 64, 1]. Finally, the RNN 601 outputs a human body region mask (mask) 603 for next time (in a case where the current time is t, time t+1). The size of the human body region mask 603 is [32, 64, 1].

In step S308 illustrated in FIG. 3A, the track updating unit 208 (FIG. 2A) performs updating of a track. The filtered feature (f-feat) 410 of the detection object calculated by the filter unit 204 (FIG. 2A) is currently in the state of being associated with the track as a result of step S306. The track updating unit 208 stores, in the internal storage unit 210, the filtered feature 410, the human body region mask 407 predicted in step S307, and the current state of the RNN 406 while associating them with the track ID. Thus, in step S308, the filtered feature 410, the human body region mask 407, and the state of the RNN 406 associated with the track ID are updated.

Moreover, with regard to a detection object to which a new ID has been assigned, no filtered feature (f-feat) is calculated. Here, the track updating unit 208 can calculate a filtered feature (f-feat) with a human body region mask (mask) all of the elements of which are 1 and update the calculated filtered feature (f-feat) as a new filtered feature (f-feat) of the track.

Thus far is processing performed during run-time. Next, processing which is performed at the time of learning is described. At the time of learning in the first exemplary embodiment, a learning apparatus 700 illustrated in FIG. 7A and a learning apparatus 710 illustrated in FIG. 7B are used. Moreover, for the purpose of explaining data which is used in the learning apparatus 710 in detail, an example of a learning data creation apparatus for the learning apparatus 710 is also discussed.

FIG. 7A is a diagram illustrating a functional configuration example of the learning apparatus 700. The learning apparatus 700 includes a learning data acquisition unit 701, a feature extraction unit 702, a loss calculation unit 703, a parameter updating unit 704, a re-identification (ReID) learning data storage unit 705, and a dictionary storage unit 706. The details of these functional constituent units are described below.

FIG. 7B is a diagram illustrating a functional configuration example of the learning apparatus 710. The learning apparatus 710 includes a learning data acquisition unit 711, a mask prediction unit 712, a loss calculation unit 713, a parameter updating unit 714, a mask ground-truth (GT) data storage unit 715, a middle feature data storage unit 716, and a dictionary storage unit 717. The details of these functional constituent units are described below.

Figures 8A, 8B:
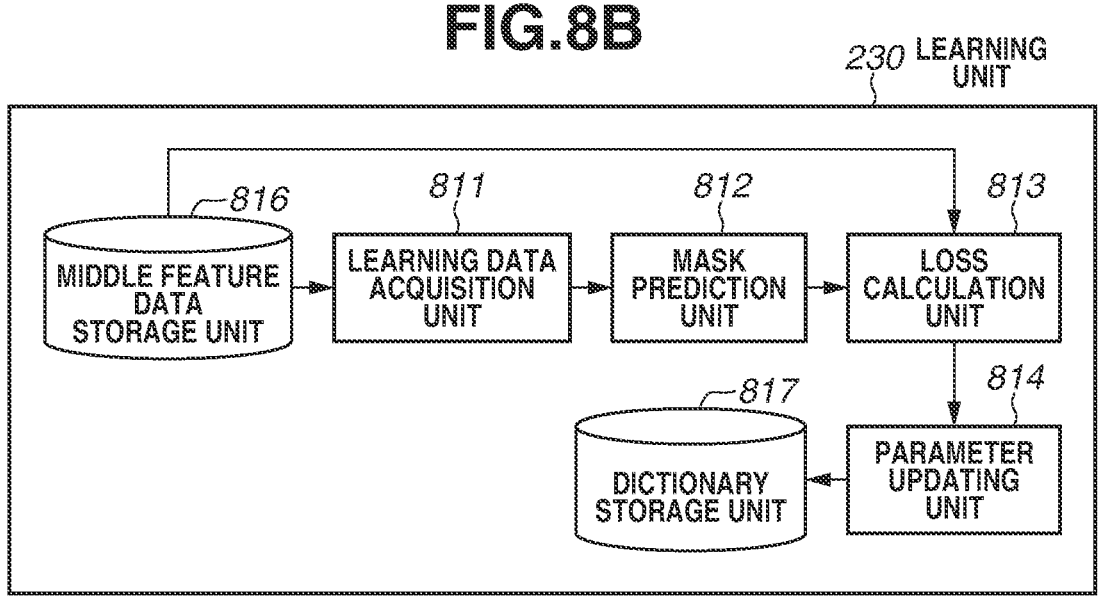
FIG. 8A is a diagram illustrating an example of a functional configuration of a learning data creation apparatus.
FIG. 8B is a diagram illustrating an example of a functional configuration of a learning unit.

FIG. 8A is a diagram illustrating a functional configuration example of a learning data creation apparatus 800. The learning data creation apparatus 800 includes a learning data acquisition unit 801, a feature extraction unit 802, a segmentation unit 803, an ID assignment unit 804, and an annotation unit 805. The learning data creation apparatus 800 further includes a dictionary storage unit 806, a tracking data storage unit 807, a middle feature data storage unit 808, and a mask GT data storage unit 809. The details of these functional constituent units are described below.

FIG. 9A is a flowchart illustrating the entire processing which is performed at the time of learning. In step S901, the learning apparatus 700 executes a subroutine for performing learning of the CNN 403 which is used by the feature extraction unit 203 (FIG. 2A) for processing during run-time. The details of step S901 are described below with reference to FIG. 9B.

After that, in step S902, the learning data creation apparatus 800 executes a subroutine for performing data creation for learning of the mask prediction unit 207 (FIG. 2A) with use of the feature extraction unit 203 which has been trained. The details of step S902 are described below with reference to FIG. 9C.

Finally, in step S903, the learning apparatus 710 executes a subroutine for performing learning of the RNN 406 which is used by the mask prediction unit 207 (FIG. 2A) for processing during run-time. The details of step S903 are described below with reference to FIG. 9D.

FIG. 9B is a flowchart illustrating the details of step S901 illustrated in FIG. 9A, in which learning of the feature extraction unit 203 is performed. In step S911, the learning apparatus 700 performs setting concerning learning of the CNN 403 which is used by the feature extraction unit 203. In the case of performing learning from the beginning, the learning apparatus 700 sets initial values of parameters of each layer of the CNN 403. In the case of performing additional learning of trained parameters, the learning apparatus 700 sets the trained parameters. Besides, the learning apparatus 700 performs setting of hyperparameters concerning learning. In the first exemplary embodiment, the learning apparatus 700 performs learning by stochastic gradient descent (SGD). Therefore, the learning apparatus 700 sets, as hyperparameters, for example, mini-batch sizes, learning coefficients, and parameters of a solver in stochastic gradient descent.

Loop L911 is a loop of n=1 to N concerning iteration in stochastic gradient descent. At this time, N can be set as a previously set value, or, in a case where a loss degrades above a fixed threshold, the loop can be ended.

In step S912, the learning data acquisition unit 701 (FIG. 7A) acquires ReID learning data stored in the ReID learning data storage unit 705 (FIG. 7A). In the ReID learning data storage unit 705, a person cropped image for learning and a person ID corresponding thereto are stored as a pair. In the person ID, the same ID is appended to images of the same person. Even in a case where a plurality of data sets is set as a source, an ID is reassigned in such a manner that the same ID is assigned to the same person.

In step S912, the learning data acquisition unit 701 acquires a pair including the image and the ID for the mini-batch size, and performs, on the images, padding processing, such as random cropping or color conversion, or preprocessing, such as normalizing. The size of an image to be supplied in subsequent steps is [width, height]=[32, 64] as with processing performed during run-time.

Figures 10A, 10B:
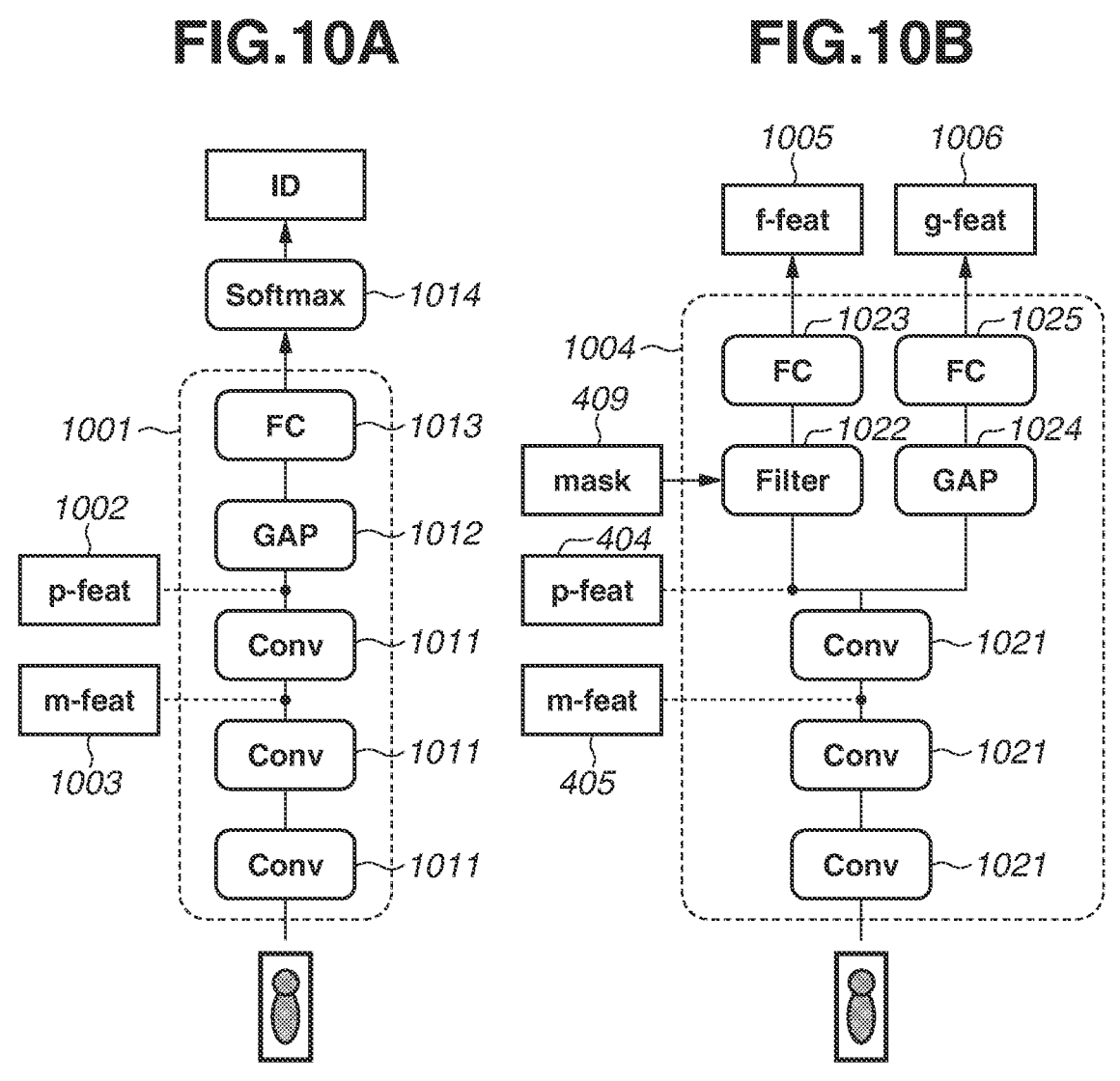

In step S913, the feature extraction unit 702 (FIG. 7A) performs extraction of a human ID feature. FIG. 10A illustrates a CNN 1001 which is used for processing performed at the time of learning. In step S913, the feature extraction unit 702 drives the CNN 1001. Unlike the CNN 403 illustrated in FIG. 4, which is used for processing performed during run-time, the CNN 1001 does not use the filter unit 408 but uses a GAP 1012 and an FC 1013. The FC 1013 is an FC having the same configuration as that of the FC illustrated in FIG. 6A. Moreover, a Conv 1011 of the CNN 1001 has the same configuration as that of the Conv of the CNN 403 illustrated in FIG. 4. Moreover, the GAP 1012 performs processing for performing, with respect to respective layer features different in spatial resolution, global average pooling for each layer and interconnecting respective results of the processing. Thus, the input of the FC 1013 is the same as an input from a filter processing unit 604 illustrated in FIG. 6A to the FC, and is a 704-dimensional vector. The output of the FC 1013 is 256-dimensional. This 256-dimensional feature of the output of the FC 1013 that is based on only the output of the GAP 1012 (that is not subjected to filtering) is hereinafter referred to as a "GAP feature (g-feat)".

Moreover, as with the CNN 403 illustrated in FIG. 4, the CNN 1001 is able to acquire a feature quantity from a middle layer. Thus, the CNN 1001 is able to acquire a pre-filtered feature (p-feat) 1002 and a middle feature (m-feat) 1003.

Here, a case where the CNN 1001 does not use the Filter illustrated in FIG. 4 but uses the GAP 1012 has been described. However, in a case where the ReID learning data also includes, besides a person ID, a correct answer (ground truth (GT)) of the region mask (mask), the CNN 1001 can be configured to use the Filter. In that case, the feature extraction unit 702 uses a GT of the region mask as with the CNN 403, which is used for processing performed during run-time, executes the filter processing unit 604 illustrated in FIG. 6A, and then performs processing for the FC.

In step S914, the loss calculation unit 703 (FIG. 7A) calculates a loss. In the first exemplary embodiment, the learning apparatus 700 performs learning of human IDs as a classification problem. The loss calculation unit 703 causes Softmax 1014 to multiply the GAP feature calculated in previous step S913 by a Softmax function, and thus calculates a cross entropy loss between the multiplied GAP feature and a person ID serving as a correct answer (ground truth) label. However, the first exemplary embodiment does not limit learning of person feature extraction to performing learning as a classification problem. The first exemplary embodiment can also use, for example, a contrastive loss or a triplet loss.

In step S915, the parameter updating unit 704 (FIG. 7A) performs updating of parameters of the CNN 1001. Here, the parameter updating unit 704 uses a cross entropy loss calculated in previous step S914 and calculates the amounts of updating of parameters of each layer of the CNN 1001 by an error backpropagation method, thus performing updating of the parameters.

Here, among the updated parameters, three Convs 1011 of the CNN 1001 are used by the feature extraction unit 203 (FIG. 2A). Moreover, the FC 1013 of the CNN 1001 is used for calculation of a filtered feature by the filter unit 204 (FIG. 2A), and is thus used by the FC illustrated in FIG. 6A. The parameter updating unit 704 then stores the updated parameters in the dictionary storage unit 706 (FIG. 7A).

The learning apparatus 700 repeats the above-described loop processing of n=1 to N. Thus far is the processing concerning learning of the CNN 403 which is used by the feature extraction unit 203 (FIG. 2A).

FIG. 9C is a flowchart illustrating the details of step S902 illustrated in FIG. 9A, thus illustrating creation of data which is used for learning by the mask prediction unit 207 (FIG. 2A).

In step S921, the learning data acquisition unit 801 (FIG. 8A) acquires learning data. The learning data is tracking data, and is previously stored in the tracking data storage unit 807 (FIG. 8A). The tracking data is stored with a moving image, a BBox targeted for tracking existing in each frame of the moving image, and a track ID associated with each other. The learning data acquisition unit 801 sequentially acquires a plurality of moving images and further acquires each moving image on a frame-by-frame basis. Additionally, the learning data acquisition unit 801 acquires a BBox targeted for tracking existing in each frame and a track ID while associating them with each other. Then, the learning data acquisition unit 801 performs preprocessing of data which is to be supplied to the feature extraction unit 802 (FIG. 8A) and the segmentation unit 803 (FIG. 8A) for use in a later step. As preprocessing of data to be supplied to the feature extraction unit 802, the learning data acquisition unit 801 crops an image (frame) with the BBox, thus resizing the image (frame) into a previously defined size. The size is [32, 64] as with the above-mentioned processing. The learning data acquisition unit 801 associates the cropped image with a moving image number, a frame number, and a track ID and supplies such processed image to the feature extraction unit 802. Moreover, the learning data acquisition unit 801 associates the image with information about a BBox, a moving image number, a frame number, and a track ID and supplies such processed image to the segmentation unit 803.

In step S922, the feature extraction unit 802 (FIG. 8A) extracts a feature quantity from the cropped image. The feature extraction unit 802 uses the CNN 1001 already trained in step S901 for feature learning in the processing performed at the time of learning illustrated in FIG. 9A. A dictionary for the trained CNN 1001 is previously stored in the dictionary storage unit 806 (FIG. 8A), and is currently read in from the feature extraction unit 802. The feature extraction unit 802 acquires the middle feature (m-feat) 1003 with use of the CNN 1001. The feature extraction unit 802 associates the acquired middle feature 1003 with information about a moving image number, a frame number, and a track ID and stores, in the middle feature data storage unit 808 (FIG. 8A), the middle feature 1003 associated with such information.

In step S923, the segmentation unit 803 (FIG. 8A) performs instance segmentation on an image. The instance segmentation uses a preliminarily trained model. Parameters of the model are previously stored in the dictionary storage unit 806 (FIG. 8A) and is currently read in by the segmentation unit 803. Moreover, when receiving an image as an input, a module for instance segmentation outputs region masks of instances of a plurality of categories including a person targeted for tracking, and further outputs BBoxes corresponding to the respective instances. The region masks and the BBoxes are associated with each other.

In step S924, the ID assignment unit 804 (FIG. 8A) performs assignment of a track ID to the region mask of each instance. The ID assignment unit 804 creates a cost matrix from the BBox and track ID supplied from the learning data acquisition unit 801 (FIG. 8A) and the BBox output from the segmentation unit 803 (FIG. 8A), solves the assignment problem, and thus performs assignment of track IDs. The cost is assumed to be a Euclidean distance of four-dimensional coordinate values (for example, center x, y, width, height) of the BBox. With this processing, the ID assignment unit 804 assigns a track ID to a region mask of each instance.

In step S925, the annotation unit 805 (FIG. 8A) performs correction of a result of segmentation by the segmentation unit 803 or a result of assignment of the track ID by the ID assignment unit 804. In this processing, the annotator visually checks an image and a region mask and track ID corresponding to the image with a graphical user interface (GUI) tool and, if it is determined that a correction is needed, the annotator manually operates the GUI tool to perform correction. While the GUI tool to be used here can include a variety of conceivable tools and is, therefore, not specifically illustrated by an example, a tool available for performing the above-mentioned operation is used. Moreover, in a case where instance segmentation or ID assignment is sufficiently highly accurate, step S925 can be omitted. The annotation unit 805 stores, in the mask GT data storage unit 809 (FIG. 8A), the region mask and the track ID processed in the above-described manner while associating them with a moving image number and a frame number. The middle feature stored in the middle feature data storage unit 808 (FIG. 8A) and the region mask stored in the mask GT data storage unit 809 (FIG. 8A) are stored while being associated with the moving image number, the frame number, and the track ID.

Thus far is the description concerning creation of data which is used for learning by the mask prediction unit 207 (FIG. 2A).

FIG. 9D is a flowchart illustrating the details of step S903 illustrated in FIG. 9A, thus illustrating learning which is performed by the mask prediction unit 207 (FIG. 2A). In step S931, the learning apparatus 710 (FIG. 7B) performs setting concerning learning of the RNN 406 which is used by the mask prediction unit 207. This processing is processing similar to that in step S911 illustrated in FIG. 9B and, therefore, the detailed description thereof is omitted.

Loop L931 is a loop concerning stochastic gradient descent. The loop L931 is a loop similar to the loop L911 illustrated in FIG. 9B and, therefore, the detailed description thereof is omitted.

In step S932, the learning data acquisition unit 711 (FIG. 7B) performs acquisition of learning data. Learning of the RNN 406 is performed by a method called backpropagation through time (BPTT). In this method, the learning apparatus 710 sequentially inputs data to the RNN 406 and sequentially acquires outputs of the RNN 406. The learning apparatus 710 calculates losses with respect to the respective sequential outputs, propagates errors while tracing back a series of outputs, and thus performs updating of parameters. Therefore, in step S932, the learning data acquisition unit 711 extracts, as data for one sample, a temporally serial data series about the same track ID and supplies the extracted data series to the mask prediction unit 712 in the subsequent stage. The data series to be supplied here is a middle feature (m-feat) which is currently stored in the middle feature data storage unit 716 (FIG. 7B).

In step S933, the mask prediction unit 712 (FIG. 7B) performs prediction of a human body region mask for next time. The RNN 406 has the same configuration as that of the RNN 601 illustrated in FIG. 6B by an example. The mask prediction unit 712 extracts an input data series (middle feature (m-feat) series) created in previous step S932 for each of times and then sequentially inputs the extracted data series to the RNN 601. The RNN 601 outputs region masks corresponding to pieces of input data for the respective times. The RNN 601 receives, as inputs, a plurality of pieces of data continuous temporally and, therefore, outputs a plurality of region masks corresponding to the respective pieces of input data.

In step S934, the loss calculation unit 713 (FIG. 7B) calculates losses. First, the loss calculation unit 713 acquires, as a correct answer (ground truth (GT)) of each region mask, a region mask for next time from the mask GT data storage unit 715 with respect to input data for each of times. Next, the loss calculation unit 713 calculates a cross entropy with a pair in GT including a region mask for each of times and a region mask for next time. Then, the loss calculation unit 713 sets the sum of respective cross entropies of a continuous plurality of pairs as a loss for one sample.

In step S935, the parameter updating unit 714 (FIG. 7B) performs updating of parameters of the RNN 601. The parameter updating unit 714 applies BPTT to the loss calculated in previous step S934, calculates the amount of updating of parameters of each layer of the RNN 601, and thus performing updating of parameters. As a result, learning is performed in such a manner that, as middle features in the middle feature series continuous temporally as a track are temporally sequentially input to the RNN 601, region masks for time next to the time of inputting are sequentially output. The parameter updating unit 714 then stores the parameters of the trained RNN 601 in the dictionary storage unit 717 (FIG. 7B).

The learning apparatus 710 repeats the above-described loop processing of n=1 to N. Thus far is the details of processing which is performed at the time of learning. With these processing operations, learning is performed on the parameters of the CNN and the RNN which are used during run-time.

As described above, according to the first exemplary embodiment, when creating a feature quantity for ID assignment, the tracking apparatus 200 performs filtering of the middle feature 405 of the CNN 403 having a spatial resolution with the human body region mask 409, thus becoming able to extract only a feature corresponding to a human body region. Therefore, in a case where persons are in proximity to each other, the tracking apparatus 200 is able to prevent turbidity of feature quantities between the persons in proximity to each other and reduce the occurrence of ID transfer in tracking.

Furthermore, while, in the first exemplary embodiment, the case of a tracking apparatus 200 to be applied to tracking has been described, the first exemplary embodiment can also be applied to, for example, an image recognition apparatus for crowd people counting task. In that case, the image recognition apparatus performs filtering of a pre-filtered feature acquired from an input of the current frame with use of a current human body region mask predicted in the previous state, and thus performs people counting. Thus, the image recognition apparatus uses, among the functional constituent units illustrated in FIG. 2A, the image data acquisition unit 201, the detection unit 202, the feature extraction unit 203, the filter unit 204, the cost calculation unit 205, and the mask prediction unit 207. Of these, the cost calculation unit 205 performs only filtering processing and people counting. This enables the image recognition apparatus to implement more accurate people counting with the influence of a background region reduced.

As described above, the tracking apparatus 200 is an example of an image recognition apparatus which recognizes a target with respect to image data. In the following description, a recognition method for the image recognition apparatus is described. The detection unit 202 detects a plurality of targets with respect to image data, and outputs a plurality of detection objects Det1 to Det3 that is based on the detected plurality of targets. The targets are, for example, the persons 104a, 104b, and 104c. The detection objects Det1 to Det3 are, for example, the BBoxes 105a, 105b, and 105c, which are circumscribed rectangles of the above-mentioned targets.

The feature extraction unit 203 extracts each of a pre-filtered feature (feature quantity) 404 and a middle feature (feature quantity) 405 from the plurality of detection objects Det1 to Det3 output from the detection unit 202.

The filter unit 204 outputs, with respect to each detection object, a filtered feature 410, which is a feature quantity obtained by filtering the pre-filtered feature 404, based on a target region mask 409 for current time for each detection object predicted at previous time. The feature extraction unit 203 and the filter unit 204 use a convolutional neural network (CNN) 403.

The mask prediction unit 207 predicts a target region mask 407 for next time in each detection object based on the middle feature 405 extracted by the feature extraction unit 203 and a state of the mask prediction unit 207. The target region mask 407 is a mask for a region in which a target exists within the BBox.

The state of the mask prediction unit 207 is the state of a recurrent neural network (RNN) 406 having a recurrent input in the previous state. The ID assignment unit 206 assigns respective identifiers (IDs) to a plurality of detection objects based on a filtered feature 410 for each detection object.

A gathering of detection objects to which the same identifier has been assigned at each of times includes tracks Track1 to Track4. The cost calculation unit 205 calculates costs for respective tracks and detection objects based on the degree of similarity between filtered features for the previous time of a plurality of tracks and filtered features for the current time of the respective detection objects. The ID assignment unit 206 assigns respective identifiers to a plurality of detection objects based on the calculated costs.

The track updating unit 208 stores, with respect to each track, the filtered feature 410 for current time output from the filter unit 204, the target region mask 409 for next time predicted by the mask prediction unit 207, and the above-mentioned assigned identifier while associating them with each other. With this processing, the track updating unit 208 updates track information.

Each of the learning apparatus 700 illustrated in FIG. 7A and the learning apparatus 710 illustrated in FIG. 7B is a learning apparatus which is used to perform learning on the tracking apparatus 200 illustrated in FIG. 2A. In the following description, a learning method for the learning apparatus 710 is described.

The mask prediction unit 712 of the learning apparatus 710, which corresponds to the mask prediction unit 207 illustrated in FIG. 2A, receives, as inputs, temporally continuous feature quantities of the same track and predicts a target region mask 407 for next time. The loss calculation unit 713 calculates a loss based on the target region mask 407 predicted by the mask prediction unit 712 and a correct answer value of the target region mask 407. The parameter updating unit 714 updates parameters of the mask prediction unit 712 based on the loss calculated by the loss calculation unit 713.

As described above, according to the first exemplary embodiment, even in a case where a plurality of targets is in proximity to each other, the image recognition apparatus is able to prevent turbidity of feature quantities and reduce the occurrence of ID transfer. In the case of tracking a plurality of targets in a moving image, the tracking apparatus 200 is able to reduce an assignment error of identifier (ID transfer).

In the first exemplary embodiment, the case of performing filtering on all of the plurality of persons existing in a frame with human body region masks has been described. However, it is rare that persons existing in a frame always overlap each other, and there is also a case where, depending on the number of existing persons, persons almost do not overlap each other. If such a case exists, even without the use of filtering, ID transfer almost does not occur.

With regard to computation for filtering, as described above in step S305 (FIG. 3A), the multiplication of a tensor of the middle feature and each element of the human body region mask and the computation for the fully connected layer (see FIG. 6A) occur a number of times corresponding to the number of combinations of detection objects and tracks. Therefore, in the first exemplary embodiment, the tracking apparatus 200 needs a large amount of calculation as compared with a case where filtering is not performed. Therefore, in a second exemplary embodiment, the tracking apparatus 200 performs filtering only in a case where the degree of overlapping of persons is greater than or equal to a fixed threshold value, and does not perform filtering in a case where the degree of overlapping of persons is less than the fixed threshold value.

The frame 102 at time t=2 illustrated in FIG. 1 is a state important for the second exemplary embodiment and is, therefore, described here. In the frame 102, occlusion of a person by another person is not occurring with regard to the person 104a in the BBox 105a, and the person 104b in the BBox 105b and the person 104c in the BBox 105c overlap each other. The BBox 105b includes a part of the region of the person 104c in the BBox 105c, and the BBox 105c includes a part of the region of the person 104b in the BBox 105b. Therefore, a feature quantity which is extracted from the BBox 105b may enter into a state of being turbid with feature quantities derived from the person 104b and the person 104c. Similarly, a feature quantity which is extracted from the BBox 105c may also enter into a state of being turbid with feature quantities derived from the person 104b and the person 104c. On the other hand, since occlusion is not occurring in the person 104a in the BBox 105a, it is considered that the corresponding track ID is able to be sufficiently identified with the feature quantity which is extracted from the BBox 105a. Therefore, the tracking apparatus 200 performs filtering of a feature quantity in a manner similar to that in the first exemplary embodiment with respect to persons the degree of occlusion by which is greater than or equal to a fixed threshold value, such as the BBox 105b and the BBox 105c. Then, with respect to a person who has no occlusion or who has only an occlusion the degree of which is less than the fixed threshold value, such as the BBox 105a, the tracking apparatus 200 extracts a feature quantity from the entire region of the BBox 105a without performing filtering.

Next, a specific functional configuration and processing in the second exemplary embodiment are described. The functional configuration and the flowchart in processing during run-time for the tracking apparatus 200 which are described in the second exemplary embodiment are the same as those in the first exemplary embodiment. Thus, the functional configuration in processing during run-time for the tracking apparatus 200 is as illustrated in FIG. 2A. The flowchart in processing during run-time for the tracking apparatus 200 is as illustrated in FIG. 3A. Moreover, most of the flow of specific processing in the second exemplary embodiment is the same as that in the first exemplary embodiment, and, therefore, the detailed description thereof is omitted except differences.

FIG. 10B is a diagram illustrating an example of a CNN 1004 which is used in the second exemplary embodiment. The CNN 1004 is used instead of the CNN 403 illustrated in FIG. 4. The CNN 1004 includes three Convs 1021, a filter (Filter) 1022, an FC 1023, a global average pooling (GAP) 1024, and an FC 1025. The CNN 1004 is able to draw out a middle feature (m-feat) 405 and a pre-filtered feature (p-feat) 404, and receives a human body region mask (mask) 409 as an input.

In the position of the pre-filtered feature 404, the CNN 1004 branches into two pathways, i.e., a pathway passing through the filter 1022 and the FC 1023 and a pathway passing through the GAP 1024 and the FC 1025.

The FC 1023 outputs a filtered feature (f-feat) 1005. The FC 1025 outputs a GAP feature (g-feat) 1006. The details of computation in the filter 1022 are similar to the contents described in step S305 (FIG. 3A) in the first exemplary embodiment.

Step S304 illustrated in FIG. 3A in the second exemplary embodiment differs from that in the first exemplary embodiment and is, therefore, described here. In step S304, the feature extraction unit 203 (FIG. 2A) performs feature extraction with use of the CNN 1004 illustrated in FIG. 10B, and thus acquires three features, i.e., a middle feature (m-feat) 405, a pre-filtered feature (p-feat) 404, and a GAP feature (g-feat) 1006. Such three pieces of information are pieces of information which are able to be calculated even at a time point when a detection object is not associated with a track. The GAP feature 1006 is a feature not to be subjected to filtering.

Step S305 illustrated in FIG. 3A in the second exemplary embodiment differs from that in the first exemplary embodiment and is, therefore, described here in detail. In step S305, the filter unit 204 (FIG. 2A) causes the cost calculation unit 205 (FIG. 2A) to calculate an ID assignment cost with respect to each combination of a track for up to the previous time and a detection object obtained at the current time. At this time, the cost calculation unit 205 calculates the degree of overlapping of human bodies with each other and determines whether the calculated degree of overlapping is less than a threshold value or is greater than or equal to the threshold value. The degree of overlapping can be calculated by, for example, Intersection of Union (IoU). A reference value for the degree of overlapping is assumed to be the threshold value.

For example, in the frame 102 at time t=2 illustrated in FIG. 1, there is no overlapping of human bodies with each other in the BBox 105a, and there is a degree of overlapping of human bodies with each other greater than or equal to the threshold value in each of the BBox 105b and the BBox 105c. Moreover, at this time, there are assumed to be four tracks as tracks for the previous time.

FIG. 5B is a diagram illustrating an example of a cost matrix 506 of the tracks Track1 to Track4 and detection objects Det1 to Det3 in that case. The BBox 105a corresponds to the detection object Det1, the BBox 105b corresponds to the detection object Det2, and the BBox 105c corresponds to the detection object Det3. As illustrated in FIG. 5B, in the second exemplary embodiment, each of the tracks Track1 to Track4 always has a GAP feature (g-feat).

Here, since the detection object Det1 has a degree of overlapping of human bodies with each other less than the threshold value, the cost calculation unit 205 calculates a GAP feature (g-feat) 1006, which is a feature that is not subjected to filtering, with use of the GAP 1024 and the FC 1025 illustrated in FIG. 10B. Then, the cost calculation unit 205 calculates a cost with use of the calculated GAP feature (g-feat) 1006. At that time, the cost calculation unit 205 calculates a cosine similarity between the calculated GAP feature (g-feat) 1006 and a GAP feature (g-feat) included in the track, and converts the cosine similarity into a cost (see step S305 in the first exemplary embodiment). The cost calculation unit 205 does not perform calculation of the filter 1022 and the FC 1023 illustrated in FIG. 10B and is, therefore, light in weight with respect to the amount of calculation. Here, the cost calculation unit 205 calculates four costs 507, 508, 509, and 510, which are combinations of the detection object Det1 and the tracks Track1 to Track4.

Since the detection objects Det2 and Det3 have degrees of overlapping of human bodies with each other greater than or equal to the threshold value, as with the first exemplary embodiment, the cost calculation unit 205 calculates a filtered feature (f-feat) 1005 with use of the filter 1022 and the FC 1023 illustrated in FIG. 10B. Then, as with the first exemplary embodiment, the cost calculation unit 205 calculates a cosine similarity between the calculated filtered feature (f-feat) 1005 and a filtered feature (f-feat) included in the track, and converts the cosine similarity into a cost. Here, the cost calculation unit 205 calculates costs other than the costs 507, 508, 509, and 510, included in the cost matrix 506.

In step S308 illustrated in FIG. 3A, the track updating unit 208 (FIG. 2A) performs, in addition to processing in step S308 in the first exemplary embodiment, calculation of a filtered feature (f-feat) with respect to a detection object having a degree of overlapping of human bodies with each other with the track ID assigned thereto.

For example, suppose that, as a result of ID assignment in the cost matrix 506 illustrated in FIG. 5B, the track Track1 has been assigned to the detection object Det1. Since, at this point of time, a filtered feature (f-feat) is not yet calculated with respect to the detection object Det1, in step S308, the track updating unit 208 performs calculation of a filtered feature (f-feat).

Moreover, in the second exemplary embodiment, information which is associated with a track ID is a GAP feature (g-feat) in addition to a filtered feature (f-feat), a predicted human body region mask (mask), and the current state of the RNN. Thus, in step S308, the track updating unit 208 updates a filtered feature (f-feat) corresponding to the track, a human body region mask (mask), the current state of the RNN, and a GAP feature (g-feat).

The functional configuration and the flowchart in processing at the time of learning in the second exemplary embodiment are the same as those in the first exemplary embodiment. Thus, the functional configuration in processing at the time of learning is as illustrated with regard to the learning apparatus 700 illustrated in FIG. 7A, the learning apparatus 710 illustrated in FIG. 7B, and the learning data creation apparatus 800 illustrated in FIG. 8A.

The flowchart in processing at the time of learning is as illustrated in FIGS. 9A to 9D. Moreover, the flow of specific processing at the time of learning is the same as that in the first exemplary embodiment, and, therefore, the detailed description thereof is omitted.

As described above, according to the second exemplary embodiment, in a case where the degree of overlapping of human bodies with each other in a BBox is less than the threshold value, the tracking apparatus 200 does not perform filtering of a feature quantity but performs ID assignment using a GAP feature (g-feat) which is acquired from the entire region in the BBox. As a result, in a case where the degree of overlapping of human bodies with each other in a BBox is less than the threshold value, the tracking apparatus 200 becomes able to calculate an assignment cost in a relatively lightweight manner, so that an overall processing load for tracking can be reduced.

Furthermore, the tracking apparatus 200 is an example of an image recognition apparatus. The detection unit 202 detects a plurality of targets with respect to image data, and outputs a plurality of detection objects Det1 to Det3 that is based on the detected plurality of targets. The GAP 1024 and the FC 1025 are an example of an averaging unit. In a case where the degree of overlapping of a plurality of targets in the detection object is less than a threshold value, the GAP 1024 and the FC 1025 output a GAP feature (averaged feature) 1006 obtained by spatially averaging the pre-filtered feature 404 extracted by the feature extraction unit 203. In a case where the degree of overlapping of a plurality of targets in the detection object is greater than or equal to the threshold value, the filter unit 204 outputs a filtered feature 1005 with use of the filter 1022 and the FC 1023.

In a case where the degree of overlapping of a plurality of targets in the detection object is less than the threshold value, the cost calculation unit 205 calculates a cost with respect to each of tracks and detection objects based on GAP features for the previous time of a plurality of tracks and a GAP feature for the current time of each detection object.

Moreover, in a case where the degree of overlapping of a plurality of targets in the detection object is greater than or equal to the threshold value, the cost calculation unit 205 calculates a cost with respect to each of tracks and detection objects based on filtered features for the previous time of a plurality of tracks and a filtered feature for the current time of each detection object.

In a case where the degree of overlapping of a plurality of targets in the detection object is greater than or equal to the threshold value, the track updating unit 208 stores the filtered feature 1005 for the current time, the target region mask 407 for the next time, and the assigned identifier while associating them with each other with respect to each track. With this processing, the track updating unit 208 updates track information. The filtered feature 1005 for the current time is output by the filter unit 204. The target region mask 407 for the next time is predicted by the mask prediction unit 207. The identifier is assigned by the ID assignment unit 206.

Moreover, in a case where the degree of overlapping of a plurality of targets in the detection object is less than the threshold value, the track updating unit 208 acquires a filtered feature 1005, which is a feature quantity obtained by filtering the pre-filtered feature 404 extracted by the feature extraction unit 203. Then, in that case, the track updating unit 208 stores the acquired filtered feature 1005 for the current time, the GAP feature 1006 for the current time, the target region mask 407 for the next time, and the assigned identifier while associating them with each other with respect to each track. With this processing, the track updating unit 208 updates track information. The GAP feature 1006 for the current time is output by the GAP 1024 and the FC 1025. The target region mask 407 for the next time is predicted by the mask prediction unit 207. The identifier is assigned by the ID assignment unit 206.

As described above, in a case where the degree of overlapping of a plurality of targets is less than a threshold value, the image recognition apparatus becomes able to calculate a cost in a relatively lightweight manner, so that a processing load can be reduced.

In the above-described first and second exemplary embodiments, the tracking apparatus 200 preliminarily creates a data set about a human body region mask and performs learning on the RNN 406, which predicts a human body region mask for next time. During run-time, the tracking apparatus 200 performs filtering of a feature quantity with use of a human body region mask which the trained RNN 406 predicts, thus preventing turbidity of a feature quantity caused by overlapping of persons with each other and reducing the occurrence of ID transfer in tracking.

In a third exemplary embodiment, the case of, in a scene of actual operation, performing learning online on a mask used for discriminating between persons based on data acquired in real time and performing filtering of a feature quantity with use of the mask is described. With this processing, even in a case where the degree of overlapping of persons with each other is large, it is possible to extract information important for discriminating between persons and reduce the occurrence of ID transfer in tracking.

Figure 2B:
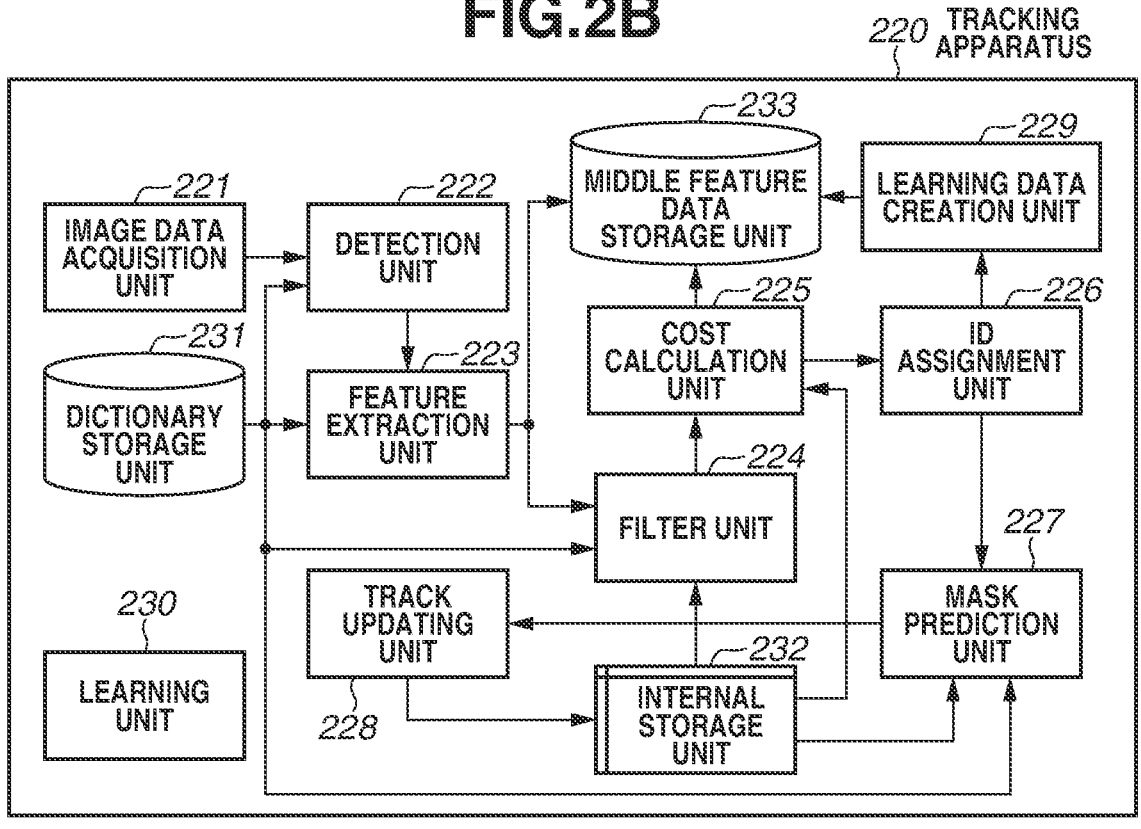

FIG. 2B is a diagram illustrating a functional configuration example in processing during run-time which is performed by a tracking apparatus 220 according to the third exemplary embodiment. The tracking apparatus 220 includes an image data acquisition unit 221, a detection unit 222, a feature extraction unit 223, a filter unit 224, a cost calculation unit 225, an ID assignment unit 226, a mask prediction unit 227, and a track updating unit 228. The tracking apparatus 220 further includes a learning data creation unit 229, a learning unit 230 a dictionary storage unit 231, an internal storage unit 232, and a middle feature data storage unit 233. The details of these functional constituent units are described with regard to only units differing from those in the first exemplary embodiment. The units which do not differ from those in the first exemplary embodiment are omitted from description as appropriate.

The image data acquisition unit 221 corresponds to the image data acquisition unit 201 illustrated in FIG. 2A. The detection unit 222 corresponds to the detection unit 202 illustrated in FIG. 2A. The feature extraction unit 223 corresponds to the feature extraction unit 203 illustrated in FIG. 2A. The filter unit 224 corresponds to the filter unit 204 illustrated in FIG. 2A. The cost calculation unit 225 corresponds to the cost calculation unit 205 illustrated in FIG. 2A.

The ID assignment unit 226 corresponds to the ID assignment unit 206 illustrated in FIG. 2A. The mask prediction unit 227 corresponds to the mask prediction unit 207 illustrated in FIG. 2A. The track updating unit 228 corresponds to the track updating unit 208 illustrated in FIG. 2A. The dictionary storage unit 231 corresponds to the dictionary storage unit 209 illustrated in FIG. 2A. The internal storage unit 232 corresponds to the internal storage unit 210 illustrated in FIG. 2A.

Figure 3B:
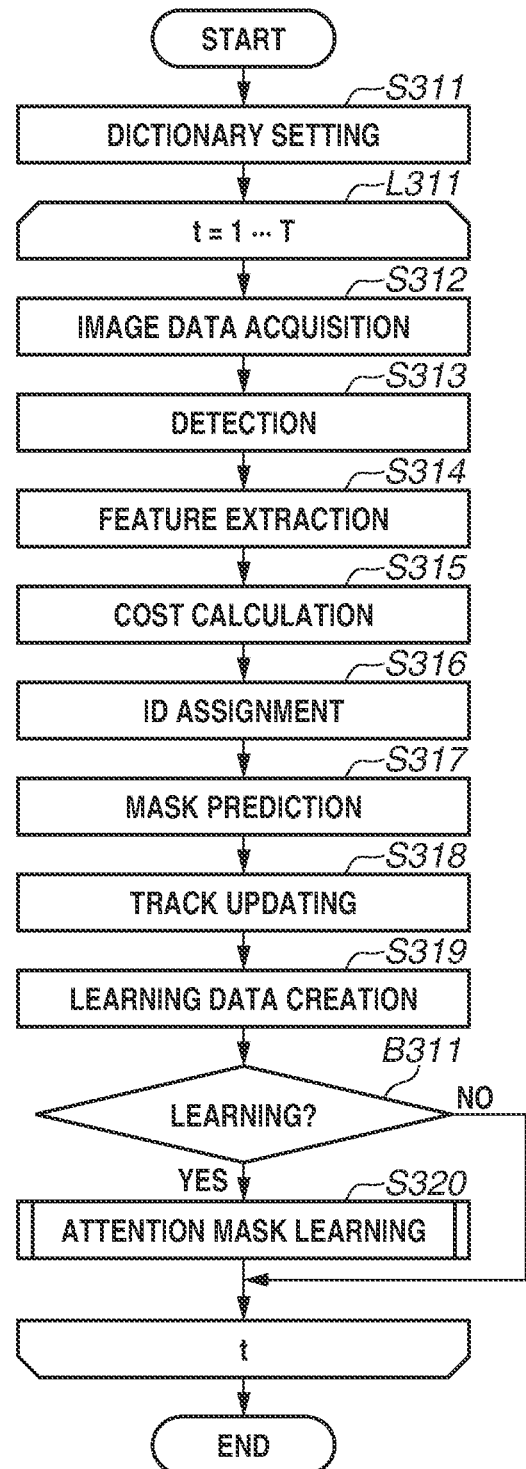

FIG. 3B is a flowchart illustrating an example of processing during run-time which is performed by the tracking apparatus 220 according to the third exemplary embodiment. Steps which differ between the third exemplary embodiment and the first exemplary embodiment are mainly described, and the other steps are omitted from description as appropriate.

Step S311, loop L311, step S312, step S313, and step S314 illustrated in FIG. 3B are similar in processing to step S301, loop L301, step S302, step S303, and step S304 illustrated in FIG. 3A and are, therefore, omitted from description. Moreover, step S316 and step S318 illustrated in FIG. 3B are similar in processing to step S306 and step S308 illustrated in FIG. 3A and are, therefore, omitted from description.

In step S315 illustrated in FIG. 3B, the filter unit 224 (FIG. 2B) and the cost calculation unit 225 (FIG. 2B) calculate an assignment cost for a track for up to previous time and a detection object for current time.

In the first exemplary embodiment, the filter unit 408 illustrated in FIG. 4 uses, to perform filtering of a feature quantity, a human body region mask 409 for current time predicted at previous time. In the third exemplary embodiment, the filter unit 224 uses, in addition to the human body region mask 409, a mask in which a position important for discriminating a tacking target is focused, thus performing filtering of a feature quantity. The latter mask is referred to as an "attention mask".

Each of the human body region mask and the attention mask is a mask of the same size which takes real number values of 0 to 1. At the time of filtering, the filter unit 224 takes the product or average of respective elements of both masks and performs integration into a mask of the same size as the original one. The filter unit 224 performs computation similar to that in the first exemplary embodiment (see FIG. 6A) on the mask obtained by integration and thus performs filtering of the pre-filtered feature (p-feat) 605. The filter unit 224 can select whether to take the product or average of respective elements as appropriate, and the advantageous effect does not essentially change due to such selection.

Figure 11:
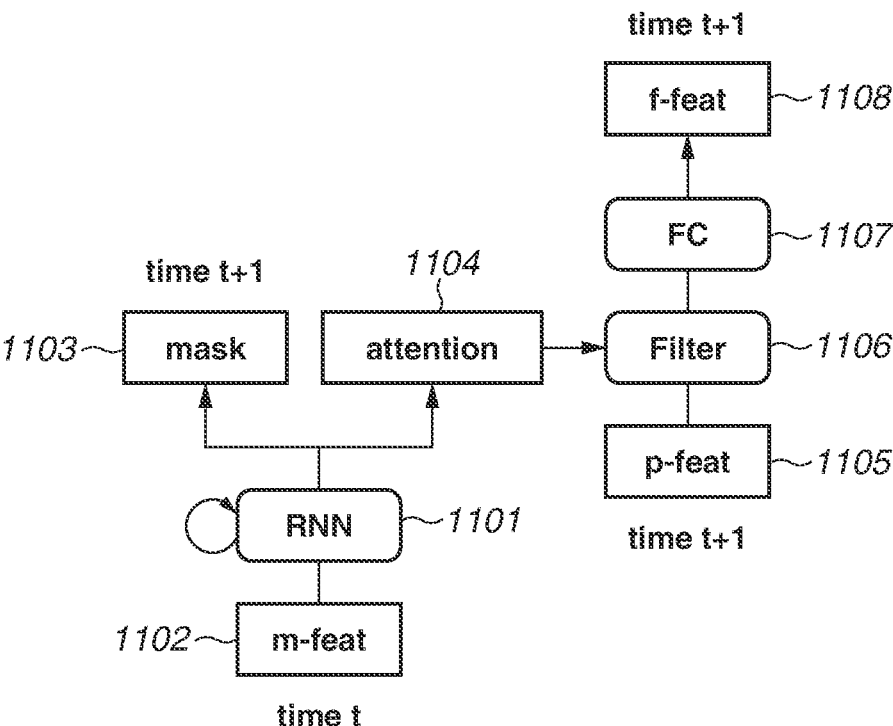
FIG. 11 is a diagram illustrating an example of an RNN.

In step S317 illustrated in FIG. 3B, the mask prediction unit 227 (FIG. 2B) performs prediction of a human body region mask and an attention mask. The RNN which the mask prediction unit 227 uses is an RNN 1101 illustrated in FIG. 11. The RNN 1101 has a configuration which outputs both a human body region mask 1103 and an attention mask 1104. More specifically, the Cony of the RNN 601 illustrated in FIG. 6B is configured to be a convolutional layer for two channel outputs. The input to the RNN 1101 is a middle feature (m-feat) 1102 similar to that in the first exemplary embodiment.

In step S319 illustrated in FIG. 3B, the learning data creation unit 229 (FIG. 2B) performs data creation for online learning of the attention mask. The attention mask is a mask used for focusing on a place important for discriminating a person existing in the same scene.

It can be said that, in tracking to be performed online, all of the feature quantities for a plurality of times of the track of a given ID are feature quantities of the same ID and feature quantities of a different track occurring concurrently are feature quantities of a different ID. The learning data creation unit 229 associates the time and the track ID handled in step S318 with feature quantities and stores them, thus being able to create learning data for online learning. In step S319, the learning data creation unit 229 associates the time and the track ID with a middle feature (m-feat) and a pre-filtered feature (p-feat), and stores them in the middle feature data storage unit 233 (FIG. 2B).

In branch B311 illustrated in FIG. 3B, the tracking apparatus 220 determines whether to perform learning of an attention mask. This determination is performed based on the amount of data of the middle feature data storage unit 233 (FIG. 2B). Here, in a case where data for about 10 samples has been stored in the middle feature data storage unit 233, the tracking apparatus 220 determines to perform learning (YES in branch B311), the tracking apparatus 220 advances the processing to step S320.

In step S320 illustrated in FIG. 3B, the learning unit 230 (FIG. 2B) performs learning of an attention mask. After that, the tracking apparatus 220 repeats the above-mentioned loop processing of time t=1 to time t=T.

FIG. 8B is a diagram illustrating a functional configuration example of the learning unit 230. The learning unit 230 includes a learning data acquisition unit 811, a mask prediction unit 812, a loss calculation unit 813, a parameter updating unit 814, a middle feature data storage unit 816, and a dictionary storage unit 817. The learning data acquisition unit 811 corresponds to the learning data acquisition unit 711 illustrated in FIG. 7B. The mask prediction unit 812 corresponds to the mask prediction unit 712 illustrated in FIG. 7B. The loss calculation unit 813 corresponds to the loss calculation unit 713 illustrated in FIG. 7B. The parameter updating unit 814 corresponds to the parameter updating unit 714 illustrated in FIG. 7B. The middle feature data storage unit 816 corresponds to the middle feature data storage unit 716 illustrated in FIG. 7B. The dictionary storage unit 817 corresponds to the dictionary storage unit 717 illustrated in FIG. 7B.

The details of processing in step S320 are similar to those of processing in the flowchart of FIG. 9D.

Thus, processing in step S320 is similar to processing in step S903 illustrated in FIG. 9A. Processing which is performed by the learning unit 230 is described with reference to FIG. 9D.

Step S931 and loop L931 illustrated in FIG. 9D are the same as the processing described in the first exemplary embodiment and, therefore, the detailed description thereof are omitted.

In step S932 illustrated in FIG. 9D, the learning data acquisition unit 811 (FIG. 8B) acquires learning data from the middle feature data storage unit 816 (FIG. 8B). The learning data acquisition unit 811 acquires, as input information to the RNN 1101, the middle feature (m-feat) 1102 and the pre-filtered feature (p-feat) 1105. The input to the RNN 1101 is temporally continuous data for a plurality of times. Here, the pre-filtered feature (p-feat) 1105 is data next by one time with respect to the middle feature (m-feat) 1102. Thus, if the middle feature (m-feat) 1102 is assumed to be data for five times, i.e., t=1, t=2, t=3, t=4, and t=5, the pre-filtered feature (p-feat) 1105 is data for five times future by one time, i.e., t=2, t=3, t=4, t=5, and t=6. The learning data acquisition unit 811 creates such time-series data with regard to a plurality of tracks and supplies the created data to next step S933.

In step S933 illustrated in FIG. 9D, the mask prediction unit 812 (FIG. 8B) predicts an attention mask 1104. The mask prediction unit 812 includes a network illustrated in FIG. 11. Here, a middle feature (m-feat) 1102 is a middle feature to be input to an RNN 1101. The RNN 1101 is an RNN which predicts the attention mask 1104. The attention mask 1104 is an attention mask to be predicted. A human body region mask 1103 is a predicted human body region mask for next time, and is the same as the human body region mask (mask) 603 illustrated in FIG. 6B. Thus, a convolutional layer of the RNN 1101 (Cony of the RNN 601 illustrated in FIG. 6B) has outputs of two channels, in which the first channel is a human body region mask 1103 described in the first exemplary embodiment and the second channel is an attention mask 1104.

In step S933, to perform learning of an attention mask for discriminating between persons, the mask prediction unit 812 further extracts a filtered feature (f-feat) 1108. To extract the filtered feature (f-feat) 1108, the mask prediction unit 812 inputs, to a filter (Filter) 1106, a pre-filtered feature (p-feat) 1105 for next time with respect to the middle feature (m-feat) 1102. The filter 1106 receives, as inputs, the human body region mask 1103, the attention mask 1104, and the pre-filtered feature (p-feat) 1105. The filter 1106 and the FC 1107 perform computations similar to those illustrated in FIG. 6A in the first exemplary embodiment and thus outputs a filtered feature (f-feat) 1108.

With the above-described computations, time-series data about the filtered feature (f-feat) 1108 future by one time with respect to time-series data about the input middle feature (m-feat) 1102 is obtained. The mask prediction unit 812 performs such inference processing on a plurality of tracks.

In step S934 illustrated in FIG. 9D, the loss calculation unit 813 (FIG. 8B) calculates losses.

Figure 12:
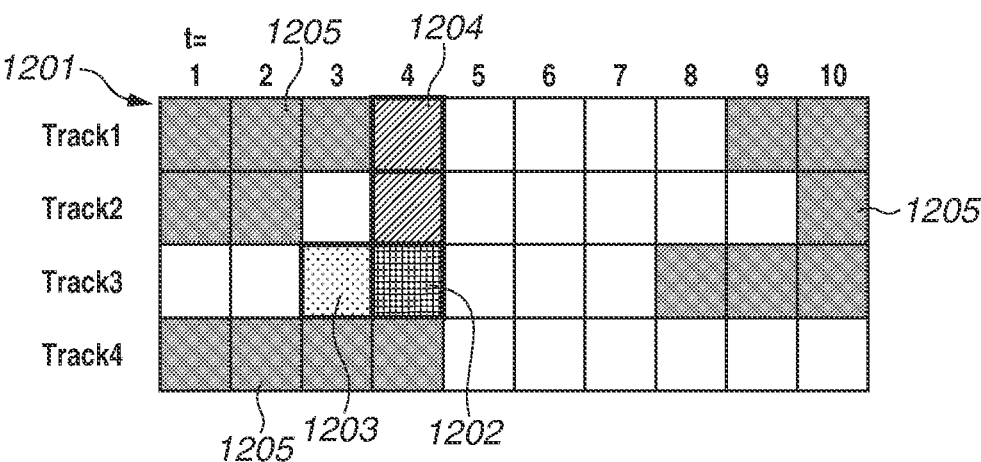
FIG. 12 is a diagram illustrating an example of learning data which is used in online learning.

FIG. 12 is a diagram illustrating an example of a table 1201 showing a relationship between time t of the filtered feature (f-feat) 1108 output in previous step S933 and a plurality of tracks Track1 to Track4. In the table 1201, the column indicates time t and the row indicates the tracks Track1 to Track4. In the table 1201, regions 1205 indicate elements of the matrix in which there is no data, and regions other than the regions 1205 indicate elements of the matrix in which there is data.

A triplet loss is used as the loss to perform learning for discriminating between persons. The triplet loss is designed in such a way as to minimize a distance between samples in the same category and maximize a distance between samples in different categories. Where the distance between samples in the same category is denoted by dp and the distance between samples in different categories is denoted by dn, the loss is expressed by the following formula. Here, α denotes a hyperparameter which is set separately with a margin.

$$\text{Loss} = \max(dp - dn + \alpha, 0)$$

In step S934, the loss calculation unit 813 sequentially calculates losses with regard to the tracks Track1 to Track4 and time t=1 to time t=10. For example, the loss calculation unit 813 selects a sample 1202 of the track Track3 and time t=4 illustrated in FIG. 12. In that case, the loss calculation unit 813 performs sampling of the distance dp starting with a sample 1203 of time t=3 and the track Track3, and performs sampling of the distance do starting with a sample 1204 of time t=4 and another track. The loss calculation unit 813 performs this processing with respect to respective times and respective tracks, and sets the sum of the respective losses as a loss of the sample series for one mini batch.

In step S935 illustrated in FIG. 9D, the parameter updating unit 814 (FIG. 8B) performs updating of parameters of the RNN 1101. The parameter updating unit 814 does not need to perform learning on parameters of all of the layers of the RNN 1101, but performs learning on only parameters corresponding to the second channel of the Cony of the RNN 601 illustrated in FIG. 6B. At that time, the parameter updating unit 814 applies BPTT to the loss calculated in previous step S934, calculates the amount of updating of parameters, and thus performing updating of parameters. As a result, an RNN 1101 which outputs an attention mask 1104 in which a region important for discriminating between persons becomes a value close to 1 is trained. The parameter updating unit 814 stores parameters of the trained RNN 1101 in the dictionary storage unit 817 (FIG. 8B). The parameters of the trained RNN 1101 are rewritten in step S935 and are then used in step S317 (FIG. 3B) in subsequent processing during run-time.

The learning unit 230 repeats the above-described loop processing of n=1 to N. Thus far are the details of processing in step S320 (FIG. 3B) for learning of the attention mask 1104. Moreover, thus far are the details of processing during run-time which is performed by the tracking apparatus 220 illustrated in FIG. 3B.

As described above, according to the third exemplary embodiment, the tracking apparatus 220 causes the learning unit 230 to perform learning online on an attention mask 1104 for discriminating between persons based on data acquired in real time in a scene of actual operation. The tracking apparatus 220 performs filtering of a feature quantity with use of the human body region mask 1103 and the attention mask 1104. With this processing, even in a case where the degree of overlapping of persons with each other is large, the tacking apparatus 200 is able to extract information important for discriminating between persons and reduce the occurrence of ID transfer in tracking.

Furthermore, the tracking apparatus 220 is an example of an image recognition apparatus. The mask prediction unit 227 predicts a target region mask 1103 and an attention mask 1104 which is used for a region important for discriminating a target. The filter unit 224 outputs, with respect to each detection object, a filtered feature 1108 obtained by filtering a pre-filtered feature 1105, based on the target region mask 1103 for current time and the attention mask 1104 for each detection object predicted at previous time. The pre-filtered feature 1105 is extracted by the feature extraction unit 223. Specifically, the filter unit 224 outputs a filtered feature 1108 based on a mask obtained by integrating the target region mask 1103 and the attention mask 1104. The learning unit 230 performs learning on parameters for prediction of the attention mask 1104 by the mask prediction unit 227, based on the middle feature 405 extracted by the feature extraction unit 223.

As described above, according to the third exemplary embodiment, even in a case where the degree of overlapping of targets with each other is large, the image recognition apparatus is able to extract information important for discriminating between targets and reduce the occurrence of ID transfer.

The present disclosure can also be implemented by performing processing for supplying a program for implementing one or more functions of the above-described exemplary embodiments to a system or apparatus via a network or a storage medium and causing one or more processors included in a computer of the system or apparatus to read out and execute the program. Moreover, the present disclosure can also be implemented by a circuit which implements the above-mentioned one or more functions (for example, an application specific integrated circuit (ASIC)).

Furthermore, each of the above-described exemplary embodiments merely represents a specific example in implementing the present disclosure, and the technical scope of the present disclosure should not be construed to be limited by such a specific example. Thus, the present disclosure can be implemented in various forms without departing from the technical idea thereof or the principal feature thereof.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-013456 filed Jan. 31, 2022, which is hereby incorporated by reference herein in its entirety.

What is claimed is:

1. An image recognition apparatus that recognizes a target with respect to image data, the image recognition apparatus comprising:

a processor; and a memory storing executable instructions which, when executed by the processor, cause the image recognition apparatus to perform operations including:

detecting a plurality of targets with respect to image data and outputting a plurality of detection objects that is based on the detected plurality of targets;

extracting respective feature quantities from the output plurality of detection objects;

outputting, with respect to each of the detection objects, a filtered feature, which is a feature quantity obtained by filtering the feature quantity extracted from each of the detection objects, based on a first mask for current time for each detection object predicted at previous time;

predicting the first mask for next time for each of the detection objects;

wherein each of the detection objects is a circumscribed rectangle of each of the targets; and wherein the first mask is a mask for a region in which each of the targets exists within the circumscribed rectangle.

2. The image recognition apparatus according to claim 1, wherein the operations further include assigning respective identifiers to the plurality of detection objects based on the filtered feature for each of the detection objects.

3. The image recognition apparatus according to claim 2, wherein a gathering of detection objects to which an identical identifier has been assigned at each of times is a track, wherein the operations further include calculating a cost for each track and each detection object based on a degree of similarity between filtered features for previous time of a plurality of tracks and a filtered feature for current time of each of the detection objects, and wherein the assigning includes assigning respective identifiers to the plurality of detection objects based on the cost.

4. The image recognition apparatus according to claim 3, wherein the operations further include updating track information by storing the output filtered feature for current time, the predicted first mask for next time, and the assigned identifier while associating them with each other with respect to each track.

5. The image recognition apparatus according to claim 3, wherein the operations further include, in a case where a degree of overlapping of a plurality of targets in each of the detection objects is less than a threshold value, outputting an average feature obtained by spatially averaging the extracted feature quantity, wherein the outputting includes, in a case where a degree of overlapping of a plurality of targets in each of the detection objects is greater than or equal to the threshold value, outputting the filtered feature, and wherein the calculating includes, in a case where a degree of overlapping of a plurality of targets in each of the detection objects is less than the threshold value, calculating a cost for each track and each detection object based on a degree of similarity between an average feature for previous time of a plurality of tracks and an average feature for current time in each of the detection objects, and, in a case where a degree of overlapping of a plurality of targets in each of the detection objects is greater than or equal to the threshold value, calculating a cost for each track and each detection object based on a degree of similarity between a filtered feature for previous time of a plurality of tracks and a filtered feature for current time in each of the detection objects.

6. The image recognition apparatus according to claim 5, wherein the operations further include, in a case where a degree of overlapping of a plurality of targets in each of the detection objects is greater than or equal to the threshold value, updating track information by storing the output filtered feature for current time, the predicted first mask for next time, and the assigned identifier while associating them with each other with respect to each track, and wherein the updating includes, in a case where a degree of overlapping of a plurality of targets in each of the detection objects is less than the threshold value, acquiring a filtered feature, which is a feature quantity obtained by filtering the extracted feature quantity, and updating track information by storing the acquired filtered feature for current time, the output average feature for current time, the predicted first mask for next time, and the assigned identifier while associating them with each other with respect to each track.

7. The image recognition apparatus according to claim 1, wherein the predicting includes predicting the first mask for next time for each of the detection objects based on the extracted feature quantity and a state of the predicting.

8. The image recognition apparatus according to claim 7, wherein the extracting includes extracting each of a first feature quantity and a second feature quantity from the plurality of detection objects, wherein the predicting includes predicting the first mask for next time for each of the detection objects based on the extracted first feature quantity and a state of the predicting, and wherein the outputting includes outputting, with respect to each of the detection objects, a filtered feature, which is a feature quantity obtained by filtering the extracted second feature quantity, based on the first mask for current time for each of the detection objects.

9. The image recognition apparatus according to claim 7, wherein the state of the predicting is a state of a first neural network.

10. The image recognition apparatus according to claim 9, wherein the first neural network is a recurrent neural network (RNN).

11. The image recognition apparatus according to claim 1, wherein the extracting and the outputting use a second neural network.

12. The image recognition apparatus according to claim 11, wherein the second neural network is a convolutional neural network (CNN).

13. The image recognition apparatus according to claim 1, wherein the predicting includes predicting the first mask and a second mask which is used for a region important for discriminating each of the targets, and wherein the outputting includes outputting, with respect to each of the detection objects, a filtered feature, which is a feature quantity obtained by filtering the extracted feature quantity, based on the first mask and the second mask for current time for each of the detection objects predicted at previous time.

14. The image recognition apparatus according to claim 13, wherein the outputting includes outputting the filtered feature based on a mask obtained by integrating the first mask and the second mask.

15. The image recognition apparatus according to claim 13, wherein the operations further include learning parameters for prediction of the second mask based on the extracted feature quantity.

16. A recognition method for an image recognition apparatus that recognizes a target with respect to image data, the recognition method comprising:

detecting a plurality of targets with respect to image data and outputting a plurality of detection objects that is based on the detected plurality of targets;

extracting respective feature quantities from the output plurality of detection objects;

outputting, with respect to each of the detection objects, a filtered feature, which is a feature quantity obtained by filtering the feature quantity extracted from each of the detection objects, based on a first mask for current time for each detection object predicted at previous time;

predicting the first mask for next time for each of the detection objects;

wherein each of the detection objects is a circumscribed rectangle of each of the targets; and wherein the first mask is a mask for a region in which each of the targets exists within the circumscribed rectangle.

17. A non-transitory computer-readable storage medium storing computer-executable instructions that, when executed by a computer, cause the computer to perform a recognition method for an image recognition apparatus that recognizes a target with respect to image data, the recognition method comprising:

detecting a plurality of targets with respect to image data and outputting a plurality of detection objects that is based on the detected plurality of targets;

extracting respective feature quantities from the output plurality of detection objects;

outputting, with respect to each of the detection objects, a filtered feature, which is a feature quantity obtained by filtering the feature quantity extracted from each of the detection objects, based on a first mask for current time for each detection object predicted at previous time;

predicting the first mask for next time for each of the detection objects;

wherein each of the detection objects is a circumscribed rectangle of each of the targets; and wherein the first mask is a mask for a region in which each of the targets exists within the circumscribed rectangle.

\* \* \* \* \*